(12) United States Patent
Zhu et al.

(10) Patent No.: US 12,117,886 B2
(45) Date of Patent: *Oct. 15, 2024

(54) SYSTEM, APPARATUS AND METHOD FOR DYNAMICALLY ADJUSTING PLATFORM POWER AND PERFORMANCE BASED ON TASK CHARACTERISTICS

(71) Applicant: INTEL CORPORATION, Santa Clara, CA (US)

(72) Inventors: Jianfang Zhu, Portland, OR (US); Deepak Samuel Kirubakaran, Hillsboro, OR (US); Raoul Rivas Toledano, Hillsboro, OR (US); Chee Lim Nge, Beaverton, OR (US); Rajshree Chabukswar, Sunnyvale, CA (US); James Hermerding, II, Vancouver, WA (US); Sudheer Nair, Portland, OR (US); William Braun, Beaverton, OR (US); Zhongsheng Wang, Camas, WA (US); Russell Fenger, Beaverton, OR (US); Udayan Kapaley, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,890

(22) Filed: Aug. 15, 2023

(65) Prior Publication Data

US 2024/0045490 A1    Feb. 8, 2024

Related U.S. Application Data

(63) Continuation of application No. 17/879,256, filed on Aug. 2, 2022, now Pat. No. 11,775,047, which is a
(Continued)

(51) Int. Cl.
  *G06F 1/32*     (2019.01)
  *G06F 1/3228*   (2019.01)
  (Continued)

(52) U.S. Cl.
  CPC ............ *G06F 1/329* (2013.01); *G06F 1/3228* (2013.01); *G06F 9/3836* (2013.01); *G06F 9/4812* (2013.01); *G06F 9/4893* (2013.01)

(58) Field of Classification Search
  CPC ................. G06F 1/32; G06F 1/12; G06F 9/44
  See application file for complete search history.

(56) References Cited

U.S. PATENT DOCUMENTS 5,629,594 A   5/1997  Jacobus et al.
6,047,308 A   4/2000  Grummer et al.
(Continued)

OTHER PUBLICATIONS

Andrea Fortuna, "Forensic Artifacts: evidences of program execution on Windows systems," May 23, 2018, 5 pages total.
(Continued)

*Primary Examiner* — Keshab R Pandey
(74) *Attorney, Agent, or Firm* — Trop, Pruner & Hu, P.C.

(57) ABSTRACT

In one embodiment, a processor includes: at least one core; and a power controller coupled to the at least one core. The power controller may include: a workload monitor circuit to calculate a background task ratio based on a first amount of time that the at least one core executed background tasks during an active duration; and a control circuit to dynamically apply a power management policy for a background mode when the background task ratio exceeds a background mode threshold, the power management policy for the background mode to reduce power consumption of the processor. Other embodiments are described and claimed.

20 Claims, 19 Drawing Sheets

Related U.S. Application Data continuation of application No. 16/830,485, filed on Mar. 26, 2020, now Pat. No. 11,422,616.

(51) Int. Cl.
  *G06F 1/329*   (2019.01)
  *G06F 9/38*    (2018.01)
  *G06F 9/48*    (2006.01)

(56) References Cited

U.S. PATENT DOCUMENTS

| | | |
|---|---|---|
| 9,798,629 B1 | 10/2017 | Shilane et al. |
| 11,698,812 B2 | 7/2023 | Gupta et al. |
| 2010/0054118 A1 | 3/2010 | Hughes |
| 2012/0260118 A1* | 10/2012 | Jiang .................... G06F 9/4893 713/340 |
| 2013/0225145 A1 | 8/2013 | Cherian |
| 2016/0299550 A1 | 10/2016 | Wei |
| 2017/0024243 A1* | 1/2017 | Kishan ................. G06F 1/3287 |
| 2017/0206007 A1 | 7/2017 | Shin |
| 2018/0260243 A1* | 9/2018 | Banerjee ............... G06F 9/4881 |
| 2018/0321972 A1* | 11/2018 | Lin ....................... G06F 9/4887 |
| 2021/0011630 A1 | 1/2021 | Zhu |

OTHER PUBLICATIONS

Intel Corporation, "Intel® Dynamic Platform and Thermal Framework (DPTF) for Chromium OS," Feb. 18, 2020, 3 pages total.

\* cited by examiner

SYSTEM, APPARATUS AND METHOD FOR DYNAMICALLY ADJUSTING PLATFORM POWER AND PERFORMANCE BASED ON TASK CHARACTERISTICS

CROSS-REFERENCE TO RELATED APPLICATION

The present application is a continuation of U.S. patent application Ser. No. 17/879,256, filed on Aug. 2, 2022, which is a continuation of U.S. patent application Ser. No. 16/830,485, filed on Mar. 26, 2020, now U.S. Pat. No. 11,422,616, issued Aug. 23, 2022, the content of which is hereby incorporated by reference.

TECHNICAL FIELD

Embodiments relate to workload scheduling in a processor.

BACKGROUND

In computer systems that are part of a large workplace or other entity, enterprise information technology (IT) facilitates management of large-scale deployment of software and services. Such deployments provide multiple manageability, maintenance, and security services on platforms using, e.g., scheduled tasks. Such operation comes at the cost of battery life and foreground responsiveness to end users. Many systems execute a large number of routine maintenance and background tasks, which are scheduled to run and over which end users do not have control, since these policies are configured and managed by IT administrators. Scheduled background task activity on an idle system may cause intermittent high processor utilization.

In addition to battery life impact, scheduled tasks run concurrently with foreground user critical tasks, resulting in resource contention and frequent thread migrations that impact foreground performance and responsiveness for user critical tasks. Average battery life on systems can be impacted by background software and services as they are scheduled to run as routine tasks, based on IT policies configured by administrator. This impacts mobility and user experience. In order to meet battery life expectations, original equipment manufacturers (OEMs) may configure low power limits on a platform while operating in DC mode, which can adversely impact user experience and responsiveness due to frequency constraints, and can cause inconsistent user experience across AC and DC modes. In addition to battery life concerns, high processor utilization from background tasks causes high heat dissipation on fanless designs, impacting user experience. And on designs that have a fan, background activity causes the fan to rotate at high speeds, resulting in bad acoustics even while the system is idle, impacting user experience.

DETAILED DESCRIPTION

Figure 1:
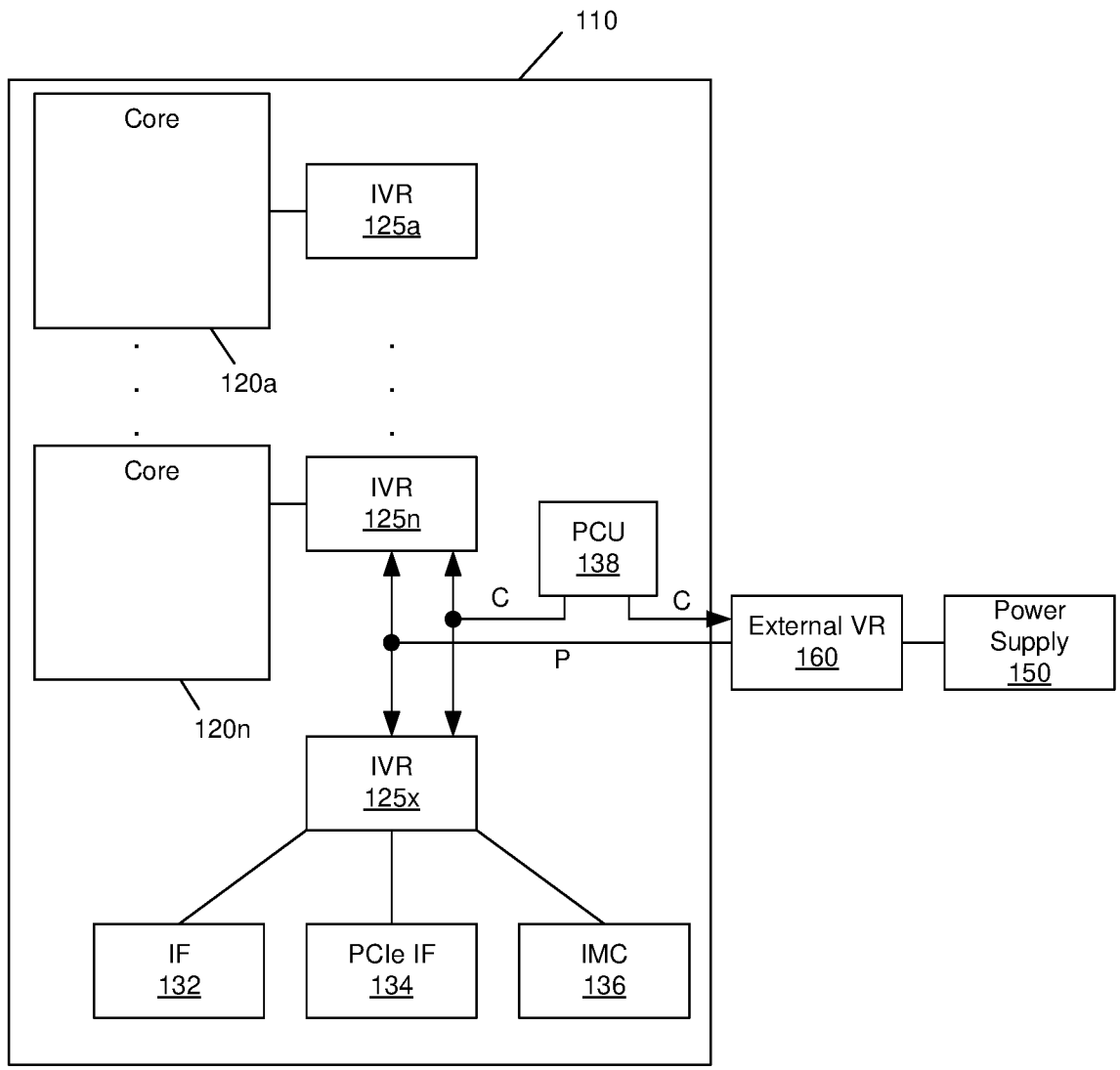
FIG. 1 is a block diagram of a portion of a system in accordance with an embodiment of the present invention.

In various embodiments, a computing system having one or more multicore processors schedules tasks on the basis of user responsiveness tasks and scheduled or background tasks. In addition, the computing system may have capabilities to dynamically detect less performant cores of multiple cores of one or more of the processors. This dynamic detection may be based on hardware of the cores themselves in systems in which different cores have heterogeneous capabilities. As examples, these heterogeneous cores may have differences in microarchitectures, instruction set architectures (ISAs), voltage/frequency (VF) curves, and/or more broadly power/performance characteristics. In other cases, such detection may be based on hardware feedback information that takes into account manufacturing variation. In yet other cases, the determination of performance capabilities may be based at least in part on an operating environment and different cores' power consumption in such environment.

With all this information, background or scheduled tasks may be restricted to one or more less performant cores. In this way, responsiveness of foreground user critical tasks may be improved by eliminating resource contention between user driven and scheduled tasks.

In different embodiments, the computing system may be a client-based system, ranging from a small portable device such as a smartphone, laptop computer or so forth to a desktop computer. Still further embodiments may be used in connection with enterprise information technology (IT) systems. With embodiments, improved responsiveness may be realized without impacting battery life and may be scalable across multiple enterprise environments, operating systems and so forth.

In one example, a system may identify its cores (or other processing units) into two classes, namely most performant and least performant cores. As described above, these different performance levels may be based either on manufacturing variation or heterogeneous architectures. Such information may be leveraged by various system entities including operating system (OS) task schedulers and platform power and performance managers, among other entities to optimize processor allocation for responsiveness, battery life and performance. Of course, additional classification of cores into more than two performants bins can be used. For example, an embodiment may bin cores into three performants bins, namely a most performant bin, a mid-performance bin, and a least performant bin. And more than three classifications of cores of course is possible also.

Information regarding different cores' capabilities may be provided in some cases to an operating system or other software entity from a power controller of the processor. This power controller may provide hardware feedback information based on current performance and efficiency of cores of the processor. With embodiments, background tasks may be scheduled with constrained resource allocation based on dynamically detecting least performant processing cores. Such control based on hardware controlled performance state (P-state), power limit control, and heterogeneous hardware feedback information may improve foreground responsiveness across a variety of different user critical tasks including application start up, browsing and productivity usages, without impacting battery life in enterprise environments.

Embodiments further may enable dynamic power management policies to deliver system optimizations based on user activity and the nature of tasks in execution. By accurately identifying scheduled background tasks and user critical foreground tasks, embodiments may deliver AC-like responsiveness while achieving battery life goals when operating on battery power. In some embodiments, a platform mode can be determined among multiple modes of operation, including an active mode of operation, a quiet mode of operation, and a responsiveness mode of operation. In an embodiment, an active mode of operation is one in which a processor is in an active state and at least some amount of user responsive or user initiated tasks are in progress, although a user may not be actively interacting with the platform. In an embodiment, a quiet mode of operation is one in which a relatively high percentage of scheduled background/maintenance tasks are running with no user interaction with the platform. And finally, a responsiveness mode is one in which foreground tasks are actively running on the platform with the user interacting with the platform in real time. Note that operation in this responsiveness mode may be significant for improving responsiveness and user experience. As examples, active mode tasks may include video or audio playback applications, user downloading file or compiling software in background; quiet mode tasks may include situations in which a user is not present with background scheduled or routine maintenance tasks running, e.g., periodic memory/disk scans; and responsiveness mode tasks may include user-driven tasks in which a user is actively interacting with the platform. Examples of responsiveness mode tasks may include application launch, file export, document-to-PDF conversion, other short duration burst tasks or so forth. Different power management policies may be configured and dynamically applied to the processor (among other platform components) during these detected modes of operation to improve performance and power.

With embodiments, opportunities to optimize for battery life during scheduled background activity on a system may be identified, while at the same time delivering responsiveness when a user is present. Such embodiments may integrate with additional technologies including an Intel® Dynamic Platform and Thermal Framework (DPTF) solution, user presence detection capabilities and machine learning (ML)-based solutions trained to detect user interaction behavior and engagement patterns.

Although the following embodiments are described with reference to specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

In embodiments herein, PCU 138 may be configured to dynamically determine hardware feedback information regarding performance and energy efficiency capabilities of hardware circuits such as cores 120. In addition, PCU 138 may also include a workload monitor circuit to calculate task ratios for foreground and background tasks. PCU 138 may further include control circuitry to update a power management policy based at least in part on one or more of the hardware feedback information, workload information, and/or mode hints, as described further herein.

Furthermore, while FIG. 1 shows an implementation in which PCU 138 is a separate processing engine (which may be implemented as a microcontroller), understand that in some cases in addition to or instead of a dedicated power controller, each core may include or be associated with a power control agent to more autonomously control power consumption independently. In some cases a hierarchical power management architecture may be provided, with PCU 138 in communication with corresponding power management agents associated with each of cores 120.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Processors described herein may leverage power management techniques that may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, CA, to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle.

Figure 2:
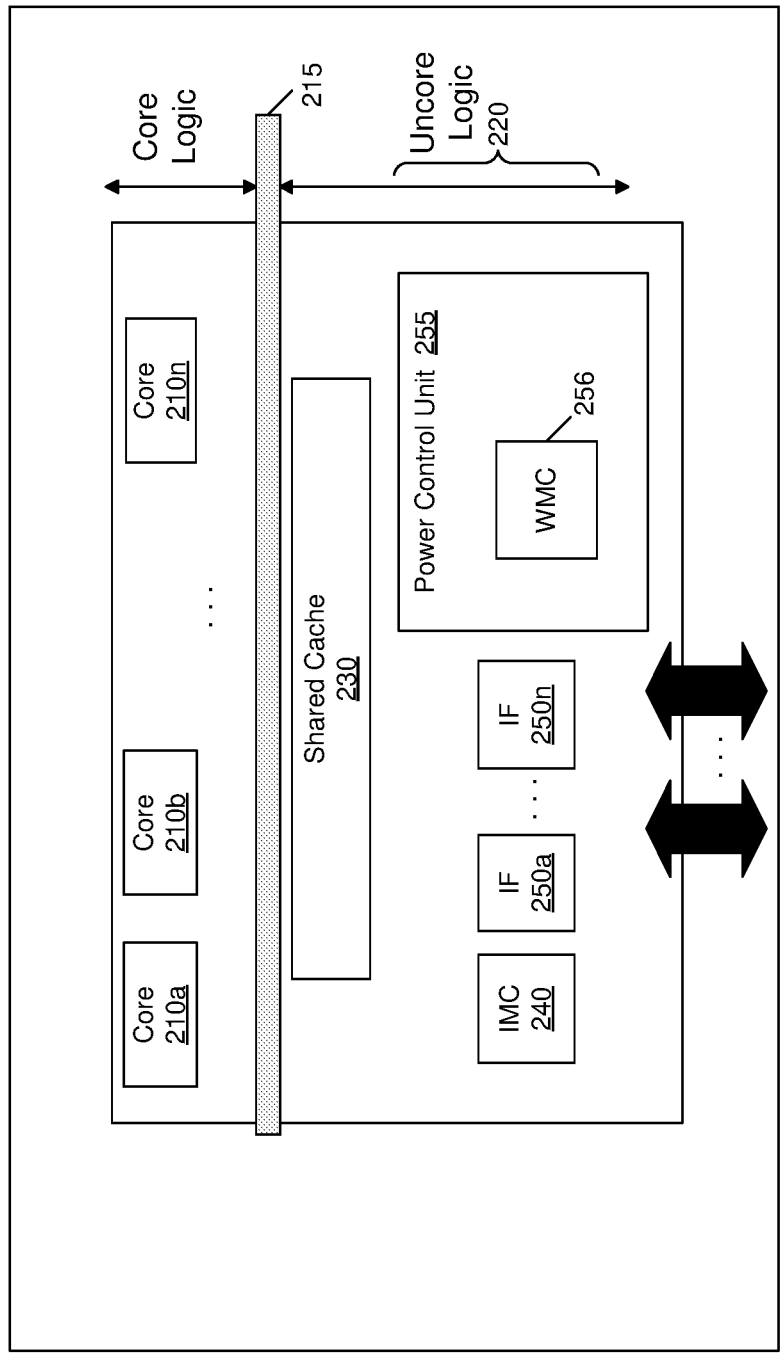
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload.

The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250 and a power control unit 255, which may include logic to perform power management techniques as described herein. In addition, power control unit 255 may include a workload monitor circuit 256, configured to dynamically determine task ratios for one or more of foreground and background tasks. Understand that power control unit 255 may further include control circuitry to update a power management policy based at least in part on one or more of hardware feedback information, workload information, and/or mode hints, as described further herein.

In addition, by interfaces $250_a$-$250_n$, connection can be made to various off-chip components such as peripheral devices, mass storage and so forth. While shown with this particular implementation in the embodiment of FIG. 2, the scope of the present invention is not limited in this regard.

Figure 3:
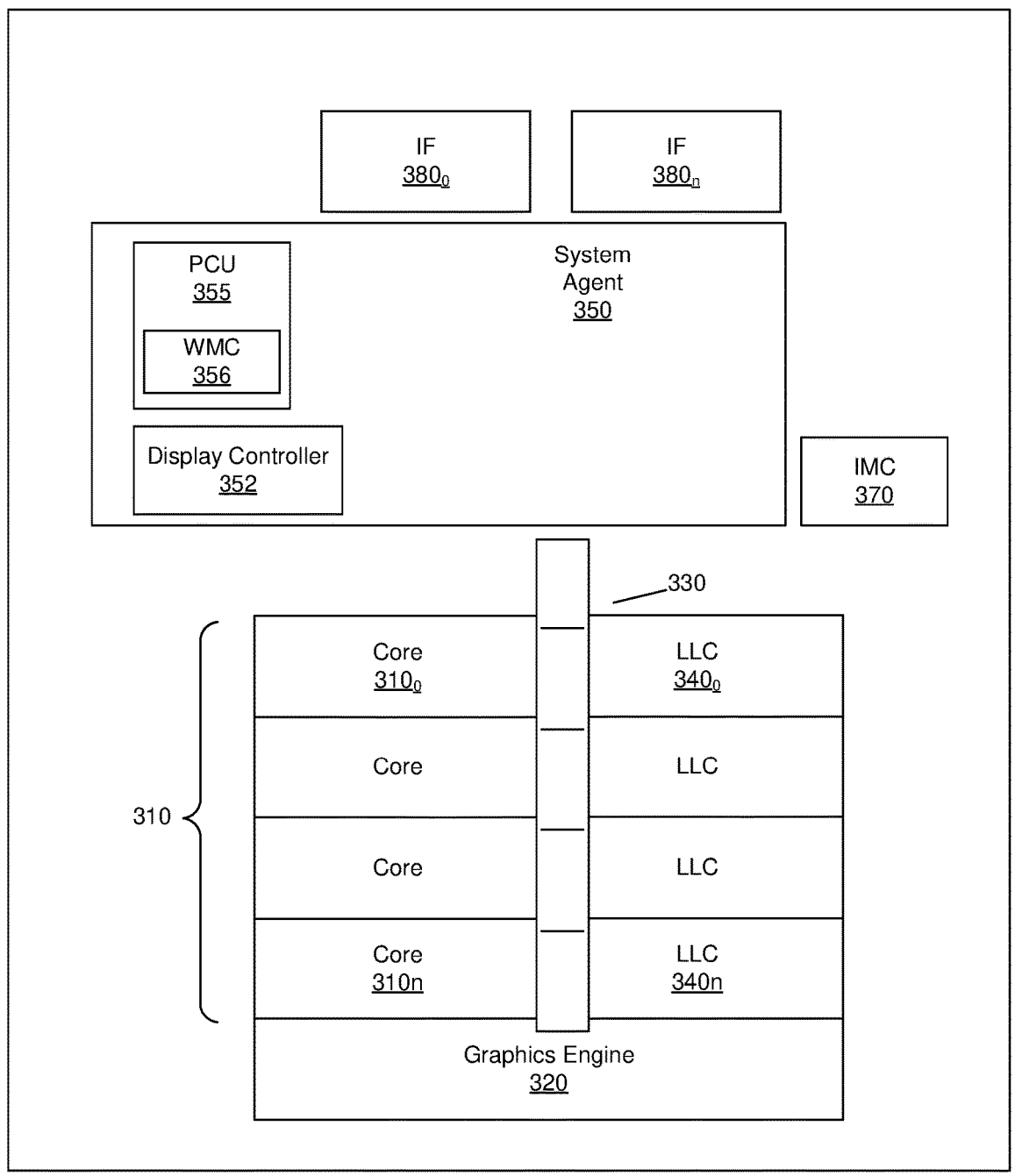
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355, which can include a workload monitor circuit 356, configured to dynamically determine task ratios for one or more of foreground and background tasks. Understand that power control unit 355 may further include control circuitry to update a power management policy based at least in part on one or more of hardware feedback information, workload information, and/or mode hints, as described herein.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
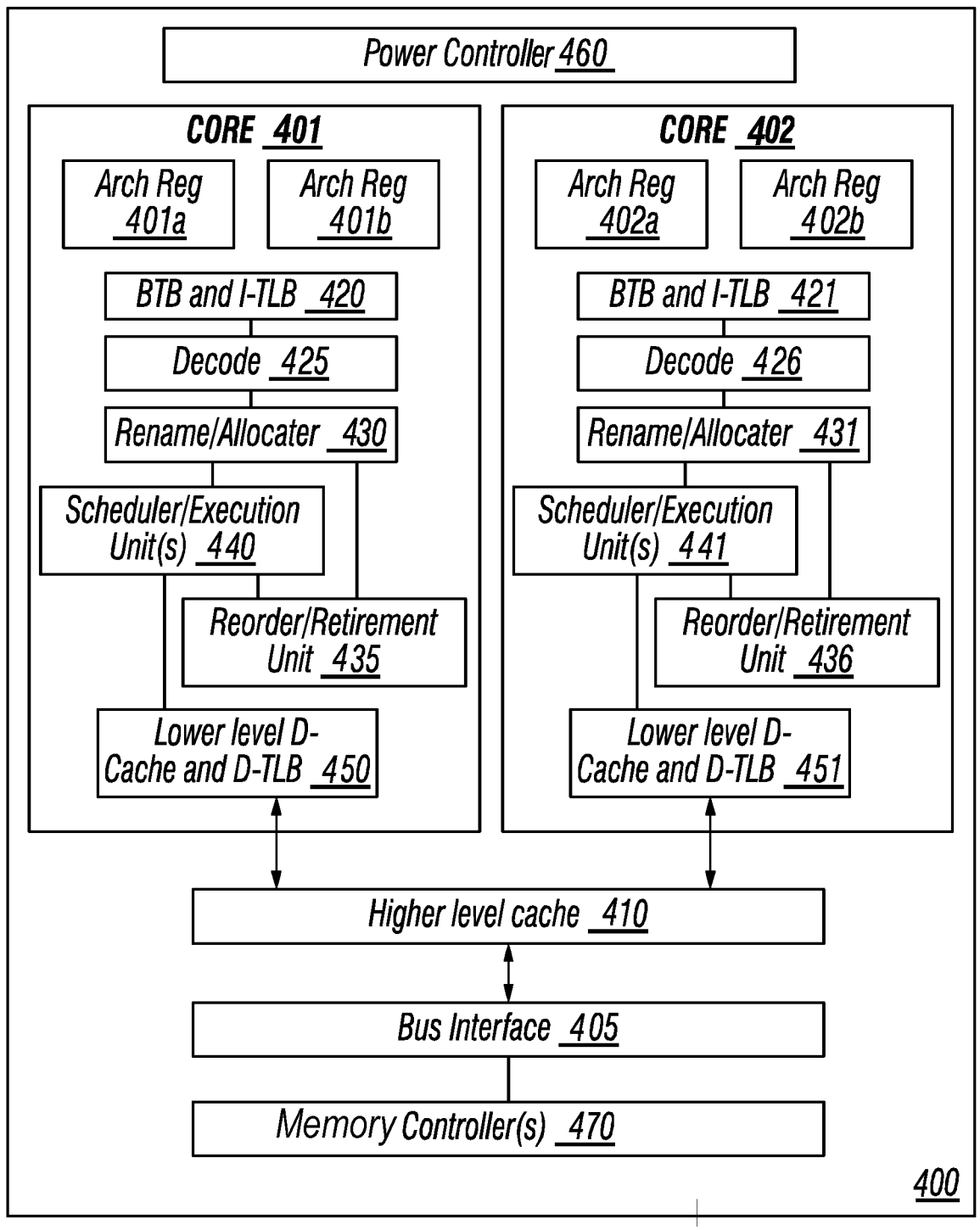
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401*a* and 401*b*, which may also be referred to as hardware thread slots 401*a* and 401*b*. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401*a*, a second thread is associated with architecture state registers 401*b*, a third thread may be associated with architecture state registers 402*a*, and a fourth thread may be associated with architecture state registers 402*b*. Here, each of the architecture state registers (401*a*, 401*b*, 402*a*, and 402*b*) may be referred to as processing elements, thread slots, or thread units, as described above. As illustrated, architecture state registers 401*a* are replicated in architecture state registers 401*b*, so individual architecture states/contexts are capable of being stored for logical processor 401*a* and logical processor 401*b*. In core 401, other smaller resources, such as instruction pointers and renaming logic in allocator and renamer block 430 may also be replicated for threads 401*a* and 401*b*. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401*a*, 401*b*, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401*a* and 401*b* are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
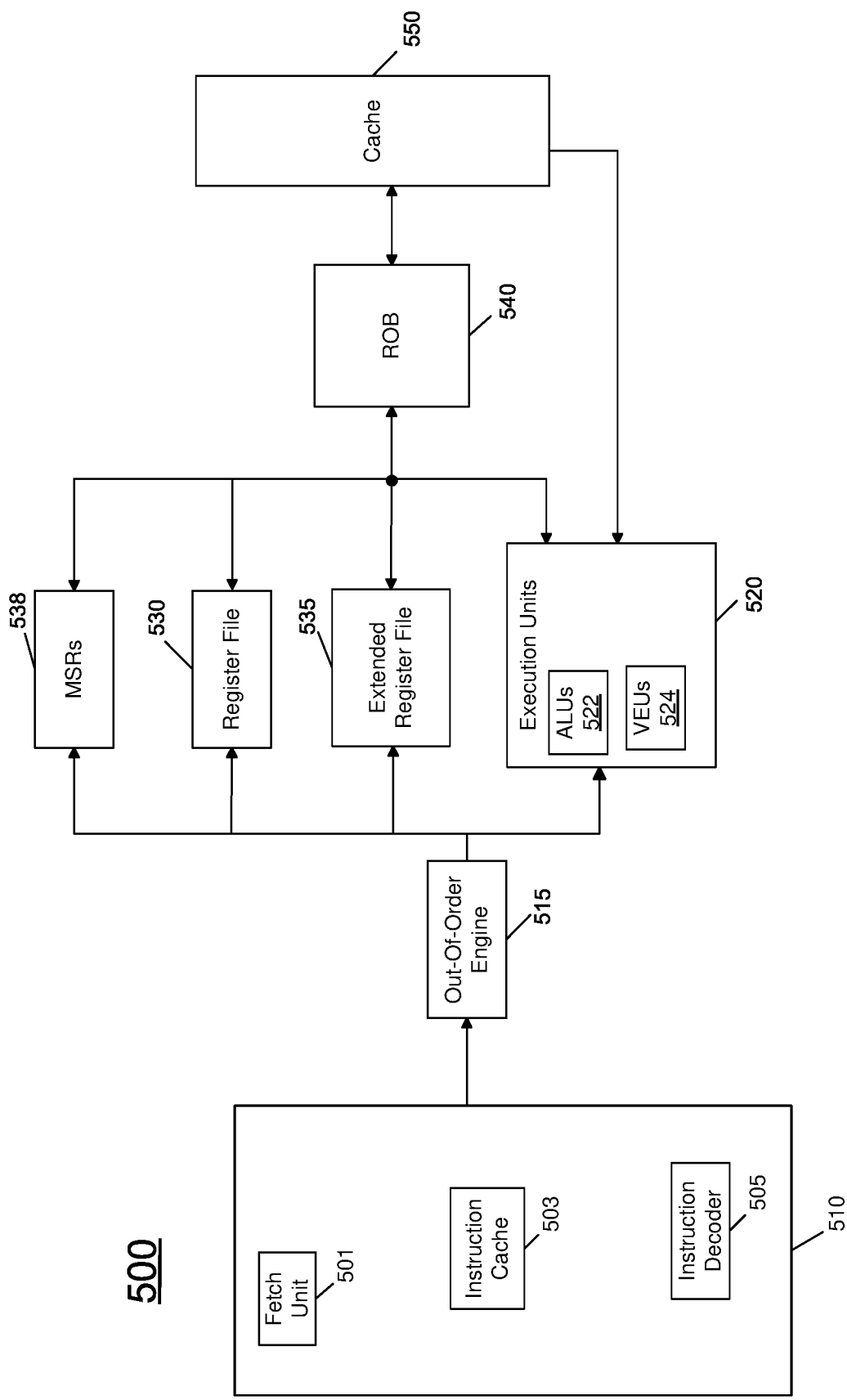
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. For purposes of configuration, control, and additional operations, a set of machine specific registers (MSRs) 538 may also be present and accessible to various logic within core 500 (and external to the core).

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. Note that performance and energy efficiency capabilities of core 500 may vary based on workload and/or processor constraints. As such, a power controller (not shown in FIG. 5) may dynamically determine feedback information including performance and energy efficiency capabilities, for use in scheduling decisions as described herein. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
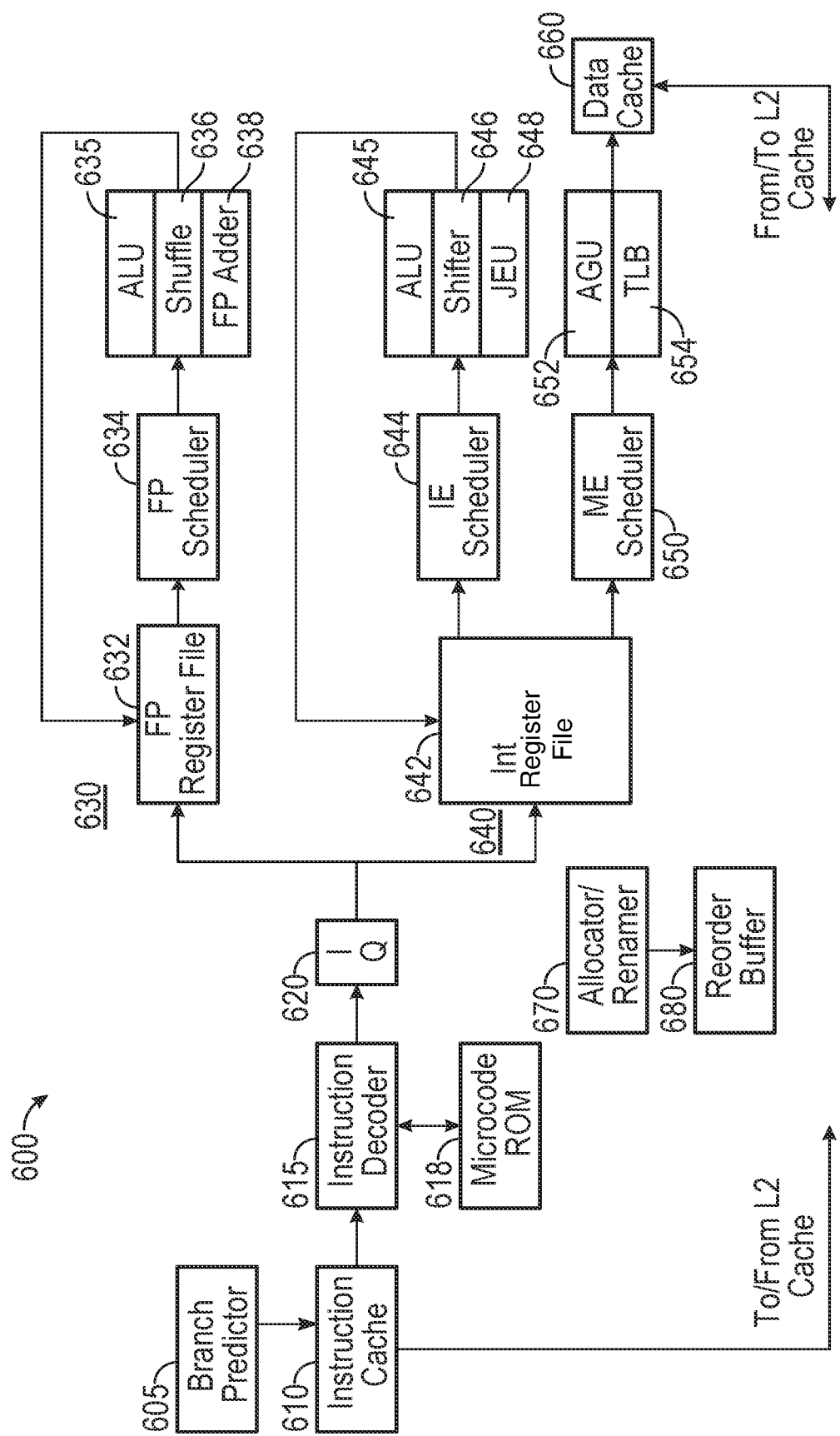
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Note that performance and energy efficiency capabilities of core 600 may vary based on workload and/or processor constraints. As such, a power controller (not shown in FIG. 6) may dynamically determine feedback information including performance and energy efficiency capabilities, for use in scheduling decisions as described herein. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
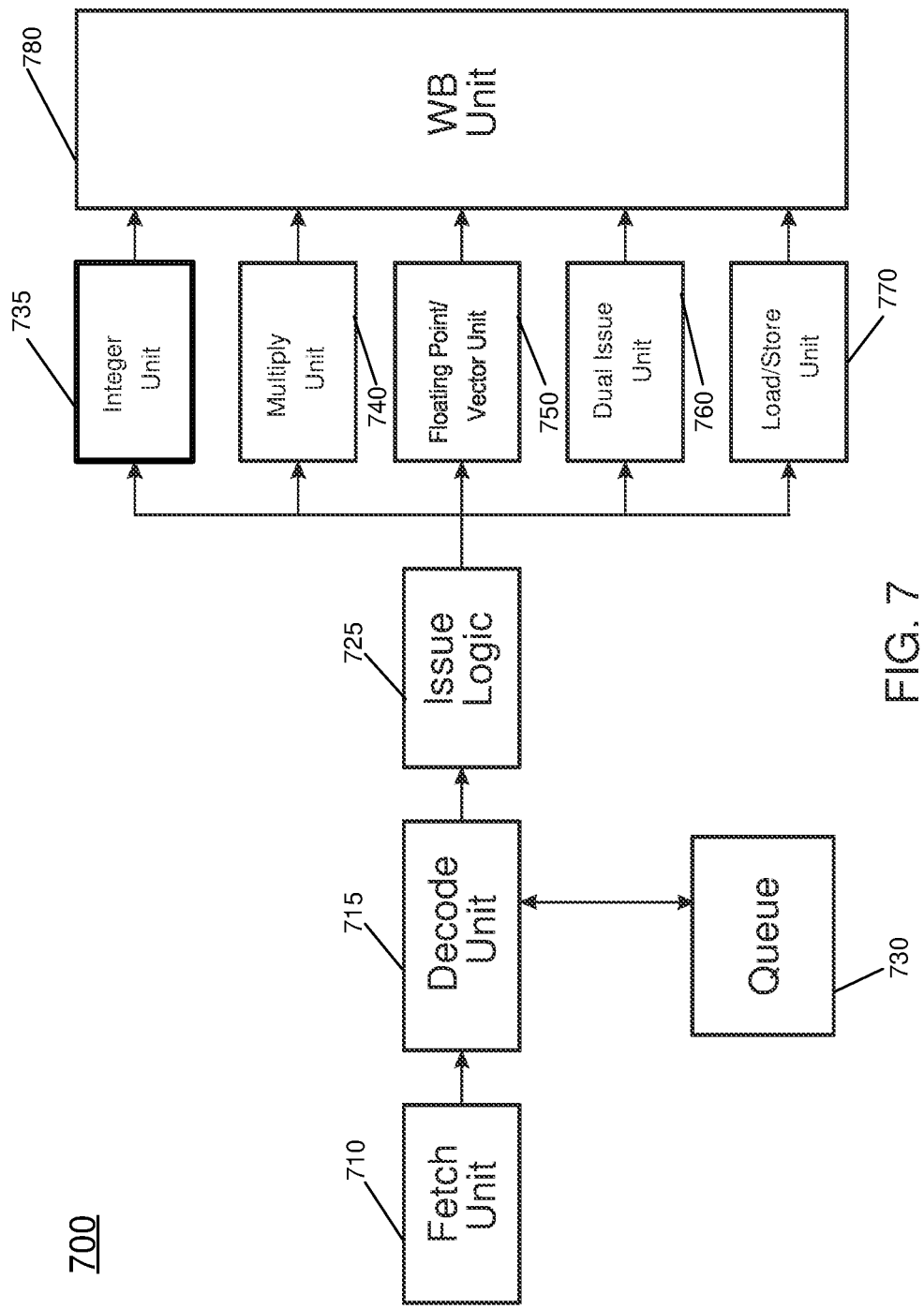
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, CA. In an implementation, an 8-stage pipeline may be provided that is configured to execute both 32-bit and 64-bit code. Core 700 includes a fetch unit 710 that is configured to fetch instructions, including an in-field self test instruction as described herein, and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
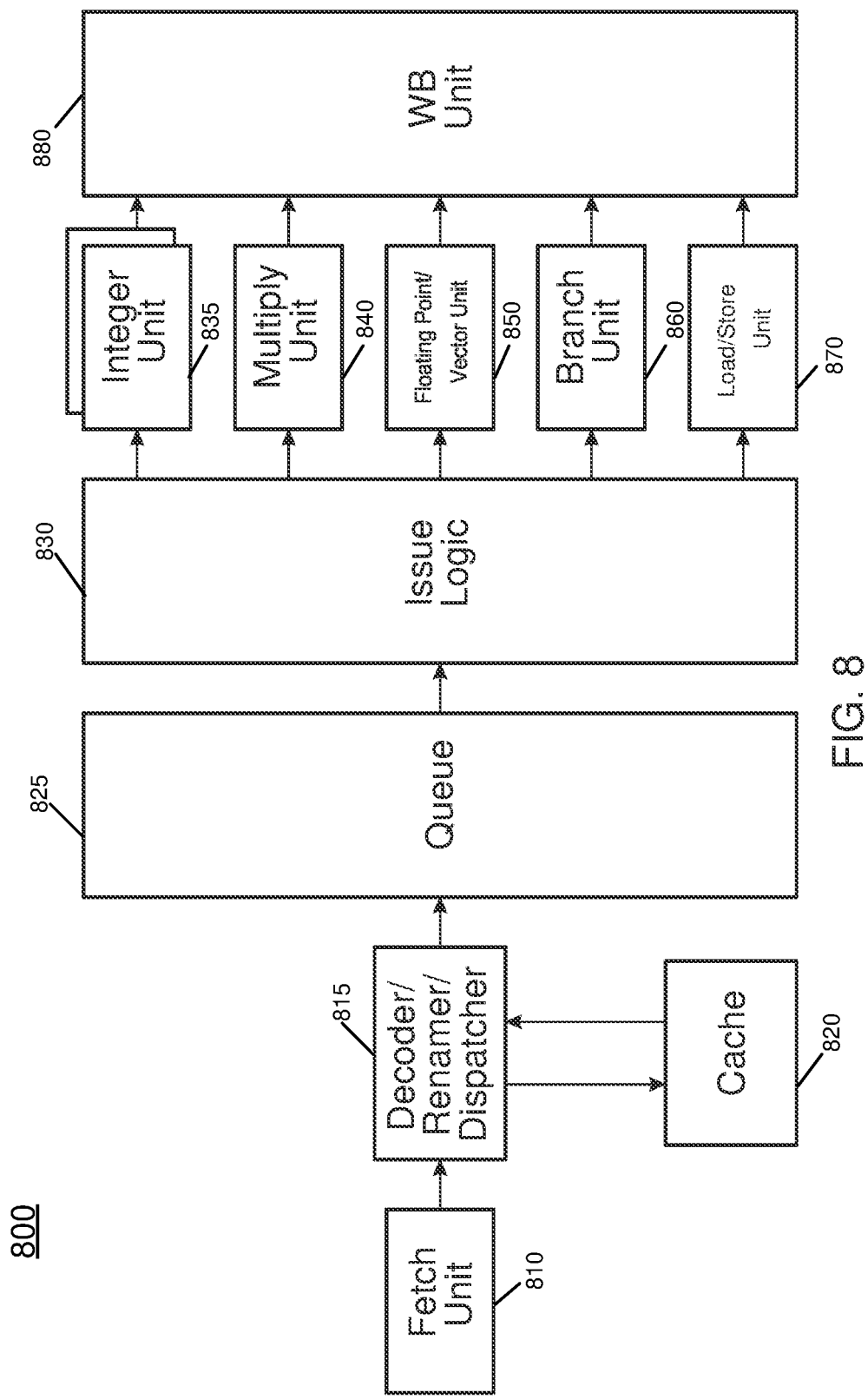
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions, including an in-field self test instruction as described herein, and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples. Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
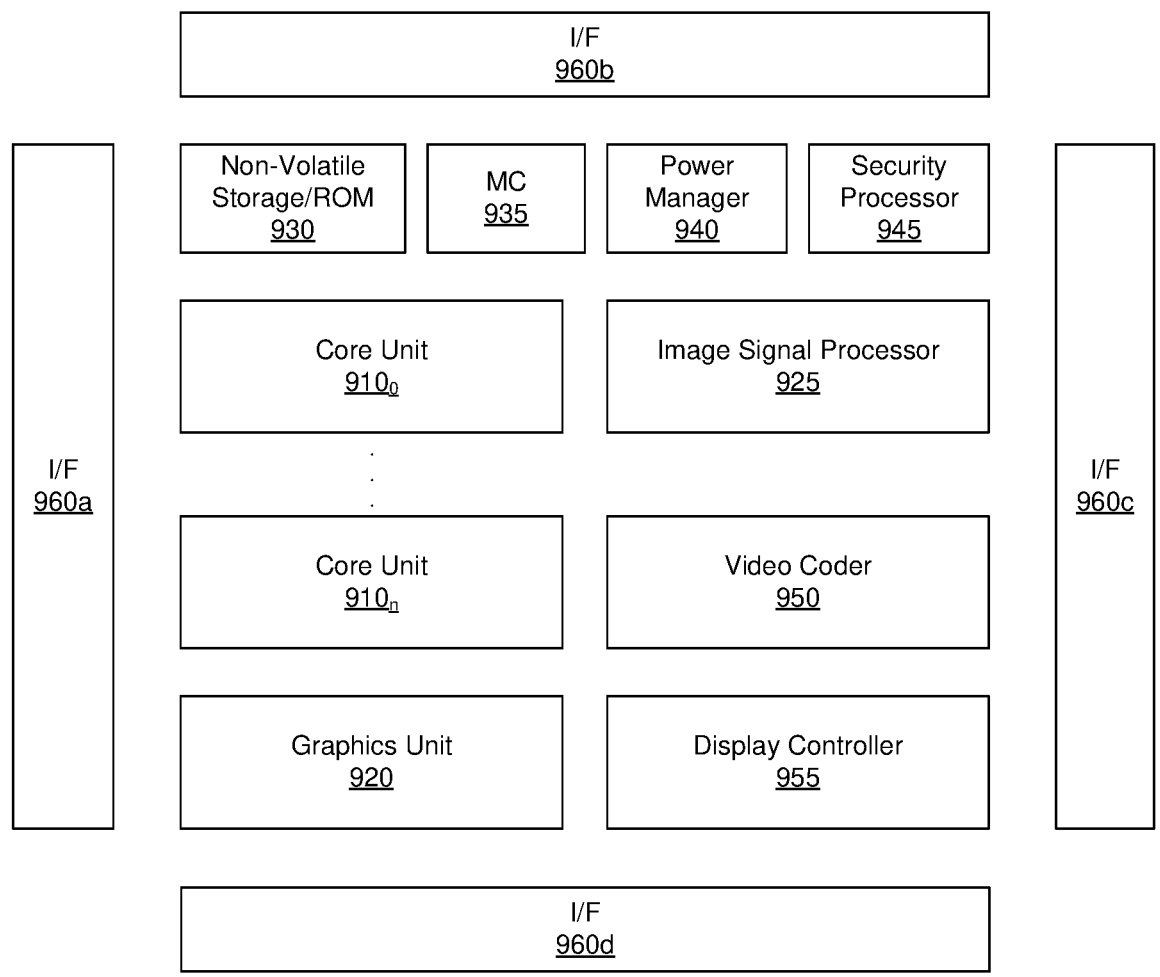
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, CA, an ARM-based design from ARM Holdings, Ltd. or licensee thereof or a MIPS-based design from MIPS Technologies, Inc. of Sunnyvale, CA, or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device, or a vehicle computing system.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software, test patterns for the diagnostic self-testing described herein, or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein, including the dynamic determination of hardware feedback information, for communication to a scheduler.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
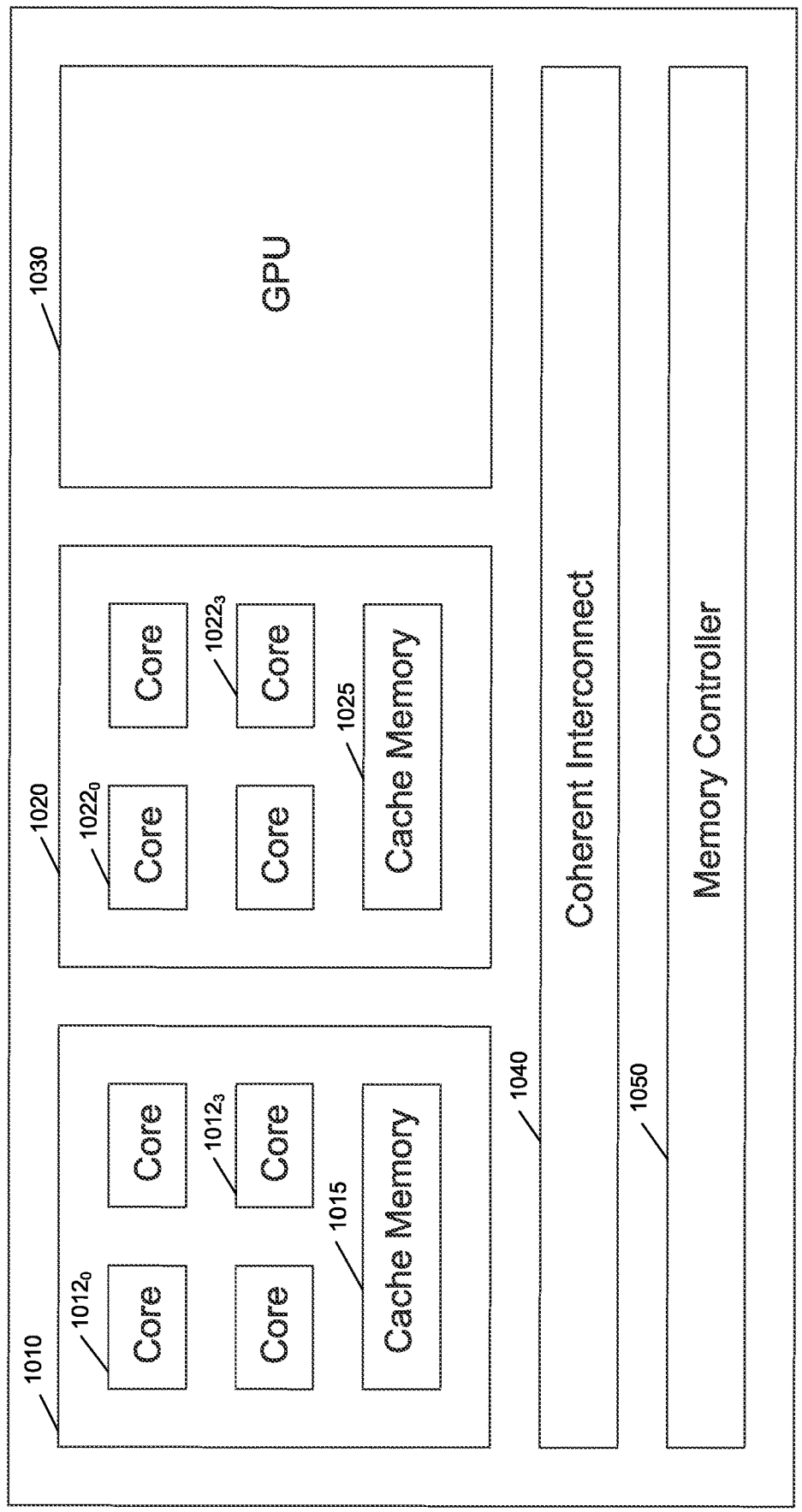
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device or vehicle computing system. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores that may interface with corresponding core perimeter logic via a mailbox interface as described herein. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
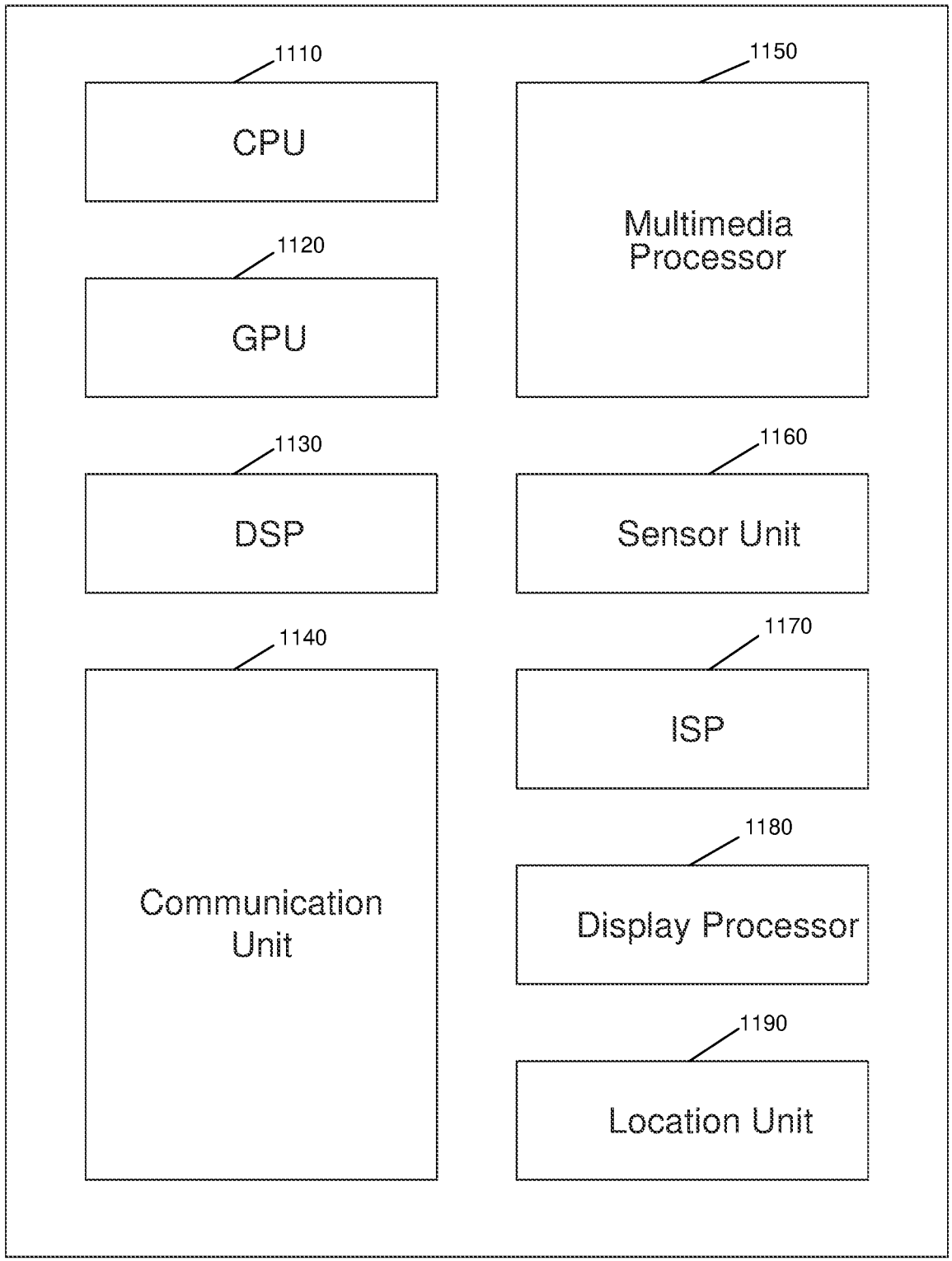
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs, vehicle computing systems, and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
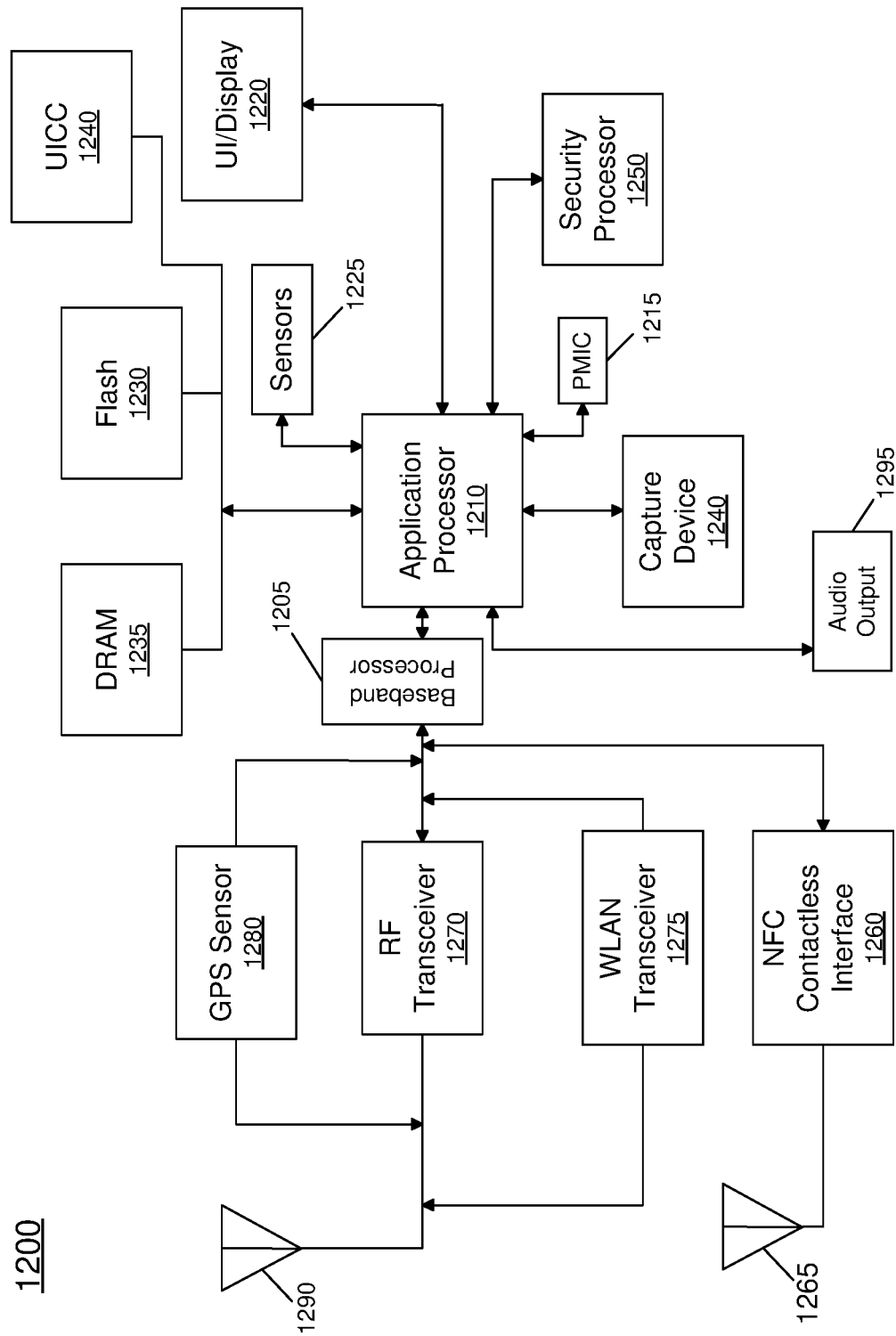
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may include a power controller as described herein, and may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
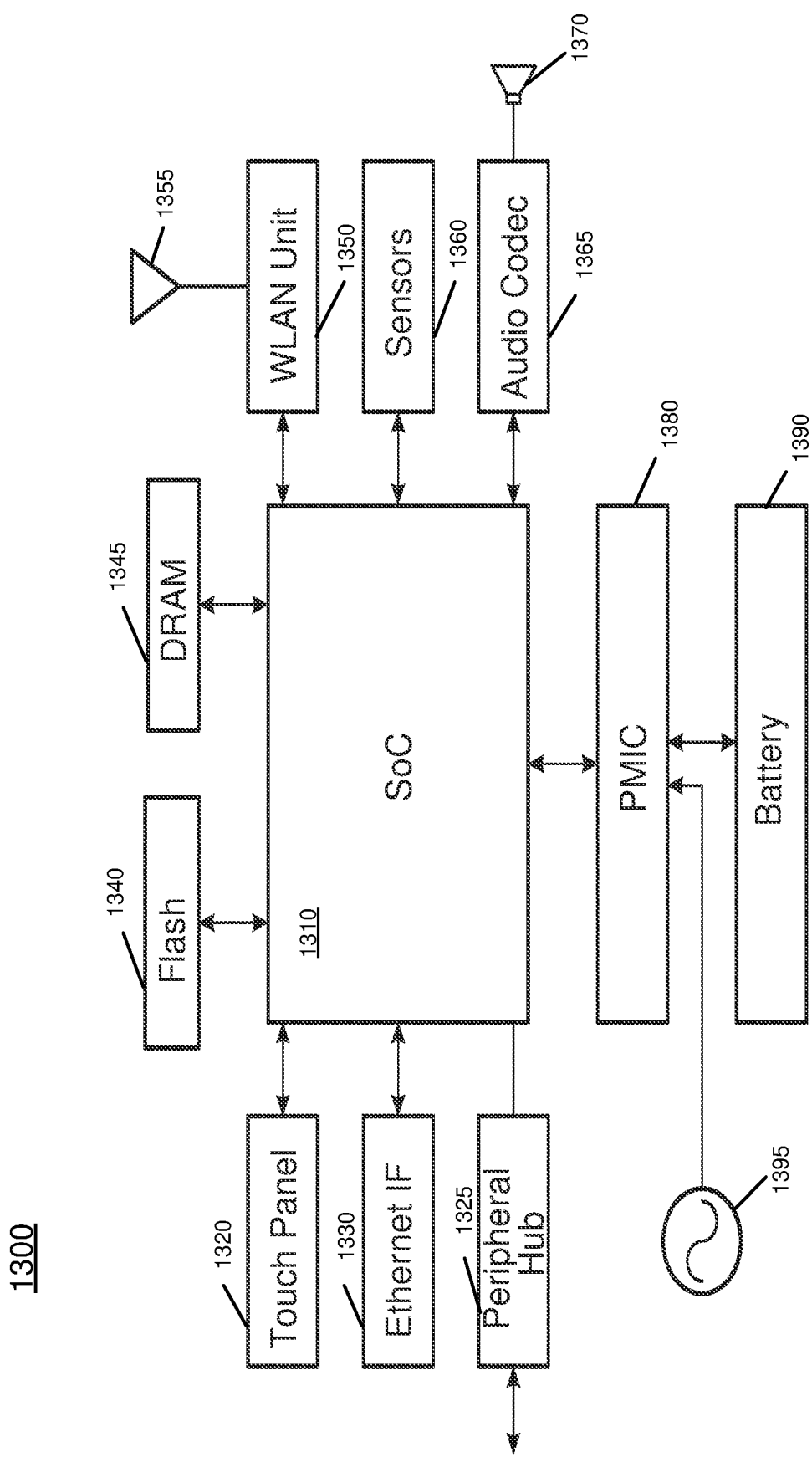
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device and which may include a power controller as described herein.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
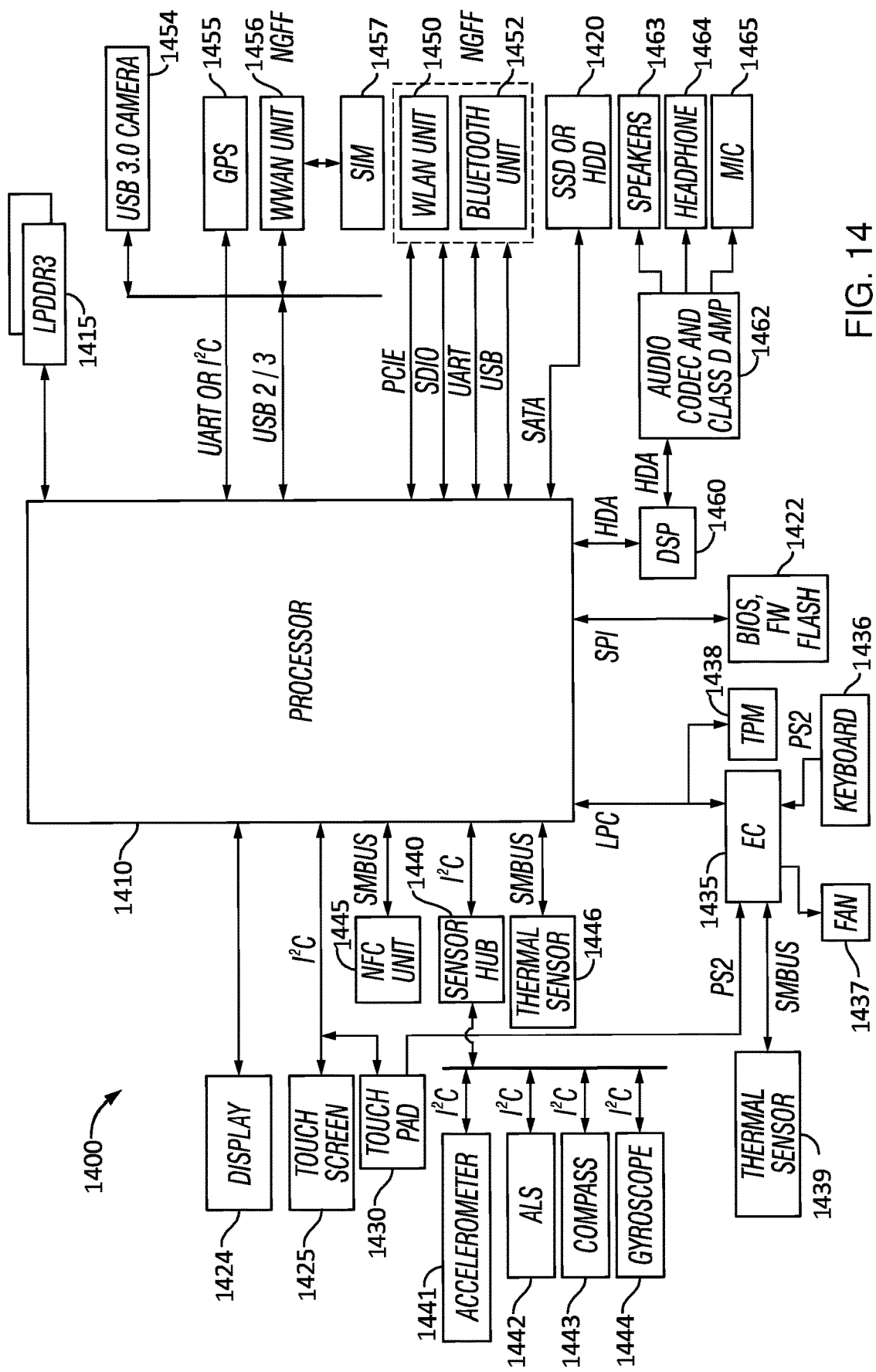
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC and which may include a power controller as described herein.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I²C interconnect. As further shown in FIG. 14, in addition to touch screen 1425, user input by way of touch can also occur via a touch pad 1430 which may be configured within the chassis and may also be coupled to the same I²C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I²C interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
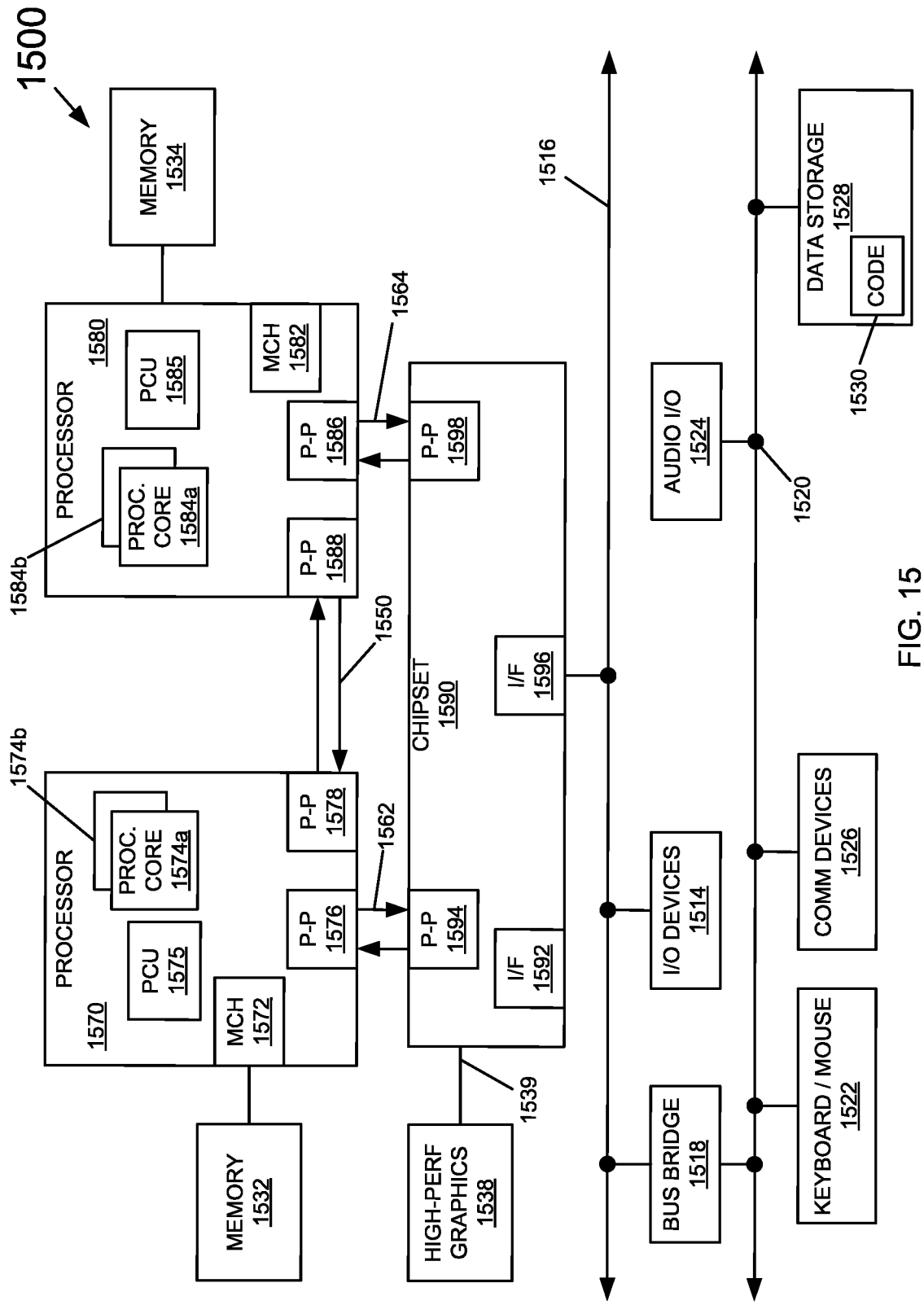
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574*a* and 1574*b* and processor cores 1584*a* and 1584*b*), although potentially many more cores may be present in the processors. Each of the processors can include a PCU 1575, 1585 or other power management logic to perform processor-based power management as described herein. To this end, PCUs 1575 and 1585 include hardware feedback control circuitry to dynamically determine capabilities of corresponding cores, workload monitor circuitry to dynamically determine task ratios, and additional control circuitry to update a power management policy based at least in part on one or more of the hardware feedback information, workload information, and/or mode hints, as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™' or so forth.

Figure 16:
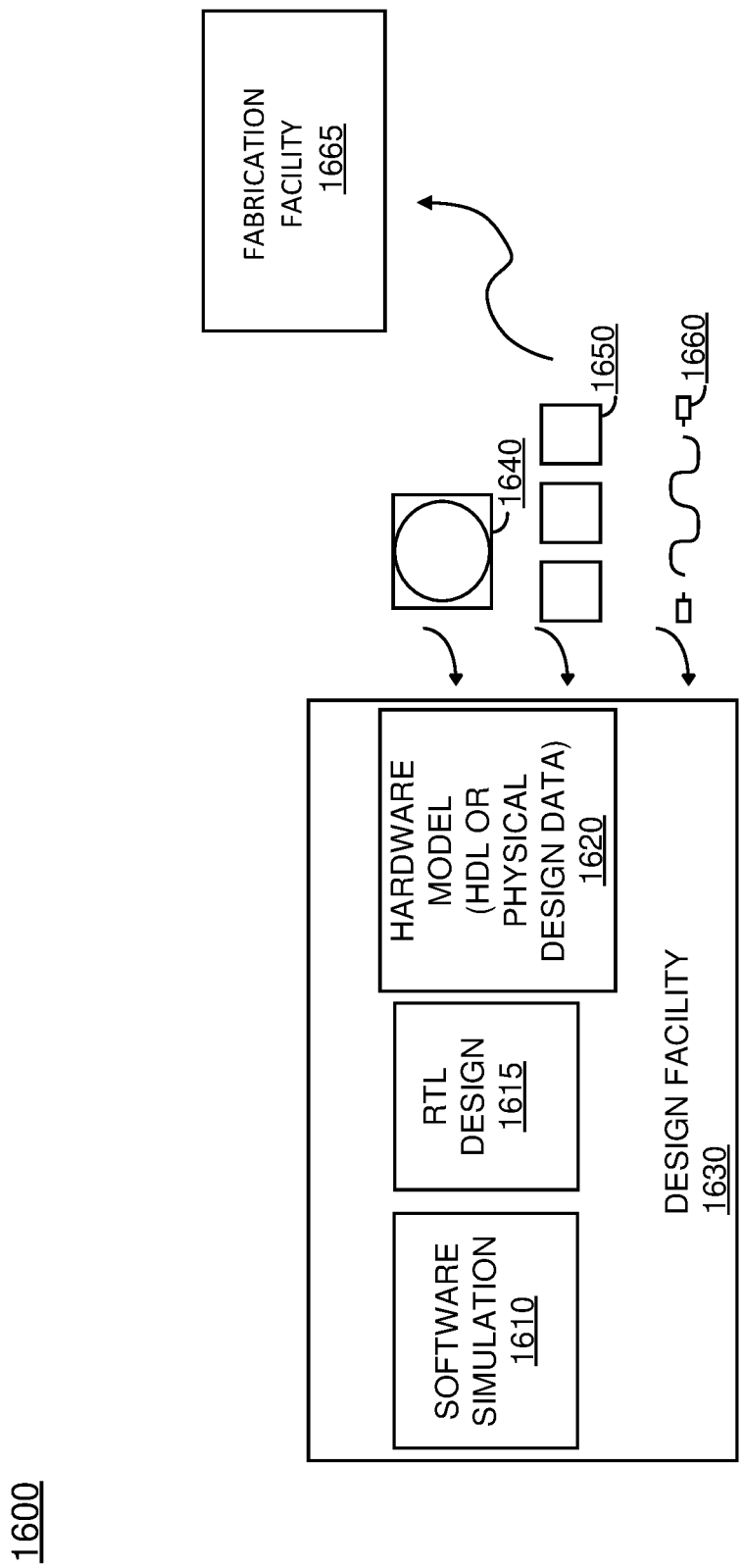
FIG. 16 is a block diagram illustrating an IP core development system used to manufacture an integrated circuit to perform operations according to an embodiment.

FIG. 16 is a block diagram illustrating an IP core development system 1600 that may be used to manufacture an integrated circuit to perform operations according to an embodiment. The IP core development system 1600 may be used to generate modular, re-usable designs that can be incorporated into a larger design or used to construct an entire integrated circuit (e.g., an SoC integrated circuit). A design facility 1630 can generate a software simulation 1610 of an IP core design in a high level programming language (e.g., C/C++). The software simulation 1610 can be used to design, test, and verify the behavior of the IP core. A register transfer level (RTL) design can then be created or synthesized from the simulation model. The RTL design 1615 is an abstraction of the behavior of the integrated circuit that models the flow of digital signals between hardware registers, including the associated logic performed using the modeled digital signals. In addition to an RTL design 1615, lower-level designs at the logic level or transistor level may also be created, designed, or synthesized. Thus, the particular details of the initial design and simulation may vary.

The RTL design 1615 or equivalent may be further synthesized by the design facility into a hardware model 1620, which may be in a hardware description language (HDL), or some other representation of physical design data. The HDL may be further simulated or tested to verify the IP core design. The IP core design can be stored for delivery to a third party fabrication facility 1665 using non-volatile memory 1640 (e.g., hard disk, flash memory, or any non-volatile storage medium). Alternately, the IP core design may be transmitted (e.g., via the Internet) over a wired connection 1650 or wireless connection 1660. The fabrication facility 1665 may then fabricate an integrated circuit that is based at least in part on the IP core design. The fabricated integrated circuit can be configured to perform operations in accordance with at least one embodiment described herein.

Figure 17:
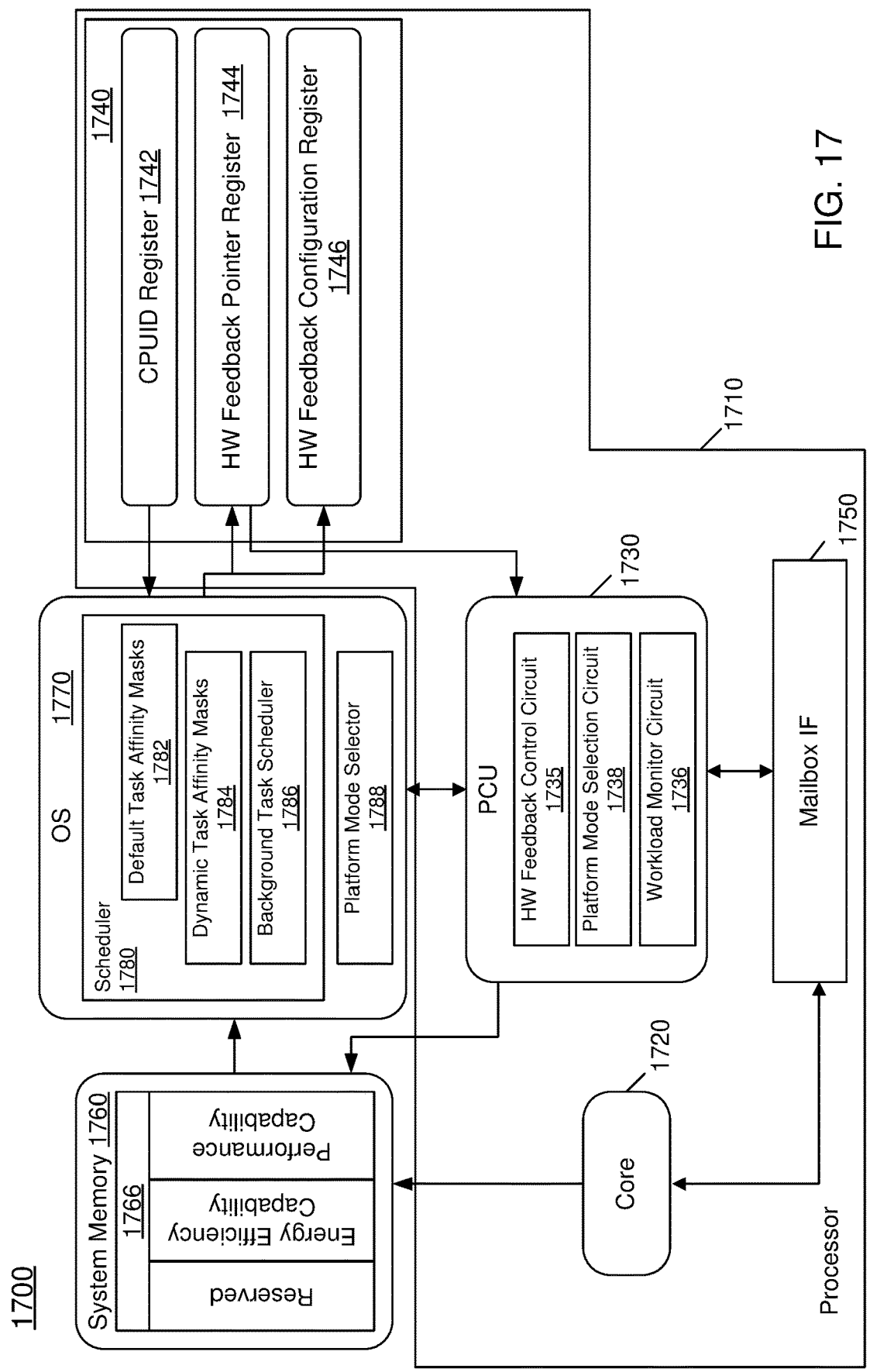
FIG. 17 is a block diagram of a system arrangement in accordance with an embodiment.

Referring now to FIG. 17, shown is a block diagram of a system arrangement in accordance with an embodiment. As illustrated in FIG. 17, system 1700 includes a processor 1710 which may be, in an embodiment, a heterogeneous multicore processor that couples to a system memory 1760 implemented as a DRAM, in one embodiment. As further illustrated, an OS 1770 executes on processor 1710. In the illustration of FIG. 17, a single core 1720 is shown for representative purposes. Understand that a plurality of cores may be present in various embodiments. Core 1720 couples to a PCU 1730 via a mailbox interface 1750 which, in an embodiment may be implemented as a microcode mailbox interface. Of course other interfaces to enable communication between core 1720 and PCU 1730 are possible.

As further illustrated, processor 1710 also includes a set of registers 1740. Registers 1740 may include a variety of machine specific registers (MSRs), status registers, configuration registers and so forth. In the particular embodiment shown in FIG. 17, such registers include a CPUID register 1742. Of interest, CPUID register 1742 may include a hardware feedback field which when set indicates that the processor is capable of providing dynamic hardware feedback information to an OS. A hardware feedback pointer MSR 1744 may include a hardware feedback pointer field to store a pointer, written by the OS, to point to a location in memory in which a hardware feedback information structure is to be stored. Understand that additional registers may be present in various embodiments. A hardware feedback configuration MSR 1746 may store a hardware feedback configuration enable field which, when set, indicates that processor 1710 is to perform hardware feedback information processing as described herein.

Still with reference to FIG. 17, PCU 1730 includes a hardware feedback control circuit 1735 which may compute hardware feedback information and trigger a writing of this information to memory 1760. In an embodiment, this hardware feedback information may include information regarding a dynamic estimation of different cores' performance and energy efficiency capabilities. With varying power/thermal state of processor 1710, relative power/performance characteristics of different cores change, and thus this information may encapsulate such dynamic changes. This information may be communicated via mailbox interface 1750 to core 1720. In turn, microcode of core 1720 may receive this hardware feedback information and write it to system memory 1760 and thereafter send an acknowledgement to PCU 1730 of the writing of this information.

PCU 1730 may further include a workload monitor circuit 1736. In embodiments herein, workload monitor circuit 1736 may be configured to classify workloads in execution on processor 1710. In an embodiment, tasks of a workload may be classified as either scheduled (or background) tasks or foreground tasks. Such information may be provided to OS scheduler 1780 as described herein. Understand while shown implemented within PCU 1730 in the embodiment of FIG. 17, a workload monitor circuit may be located in other portions of a processor in other embodiments.

As shown in FIG. 17, system memory 1760 includes a hardware feedback structure 1766 that may store hardware feedback information as a data structure having two vectors: performance and efficiency, where each vector represents a sorted list of enumerated cores with respect to relative performance and efficiency. Note that in other embodiments, a direct interface may be provided to enable PCU 1730 to directly write this hardware feedback information to system memory 1760. In embodiments, prior to actually being written to memory, the hardware feedback information may be temporarily cached as writeback information, e.g., in a last level cache of processor 1710. As such, OS 1770 may access the hardware feedback information either from the LLC if present therein or from memory 1760.

As shown in FIG. 17, OS 1770 includes among its components a scheduler 1780. In an embodiment herein, scheduler 1780 may be dynamically aware of performance capabilities of processing cores and other processing elements and may use this information in scheduling workloads to the cores. More specifically as described herein, dynamic task affinity masks may be developed for background tasks. OS scheduler 1780 then may use such masks in scheduling background tasks to lower performing cores.

As seen, scheduler 1780 includes default task affinity masks 1782. Such masks may be set using information received on task creation based on the application/task preference. As further shown, scheduler 1780 also includes dynamic task affinity masks 1784. These masks may be set as described herein based on feedback information received from a power controller, e.g., PCU 1730. A background task scheduler 1786 may restrict task preferred affinity and schedule background tasks to least (or less) performant cores according to the information in dynamic task affinity masks 1784.

Still with reference to OS 1770, in some embodiments a platform mode selector 1788 also may be present. Platform mode selector 1788 may determine, based at least in part on a level of background tasks in execution and user interaction, a platform mode of operation and provide such information to a power controller. As described herein, based on a level of background task execution and user presence (or not), platform mode selector 1788 may select a platform mode. Although embodiments are not limited in this regard these platform modes may include an active mode, a quiet mode and a responsiveness mode. When platform mode selector 1788 determines a change in platform mode, it may send mode information to PCU 1730, which may update a power management policy based on this change.

In other cases, a determination of platform mode may be made within circuitry of PCU 1730. As shown in FIG. 17, PCU 1730 may further include a platform mode selection circuit 1738. Selection circuit 1738 may be configured to determine an appropriate mode of operation for a platform such as system 1700 based at least in part on foreground and background task ratios, comparisons of the same to corresponding threshold values, and further based on a user presence determination. While shown in the embodiment of FIG. 17 as being present within PCU 1730, a platform mode selection circuit may be located in other locations. For example, in other embodiments combinations of platform mode selection circuit 1738 and platform mode selector 1788 may determine an appropriate platform mode. Understand that PCU 1730 may include various control circuitry, including control circuitry configured, based at least in part on determination of a platform mode, to dynamically apply or update a power management policy for the detected mode of operation to improve performance, efficiency or combinations thereof. Understand while shown at this high level in the embodiment of FIG. 17, many variations and alternatives are possible.

In various embodiments, a system may actively and dynamically query core capability information to identify least performing cores. In one embodiment, such information may be queried using a hardware P-state (HWP) capabilities MSR. In other cases, dynamic hardware-guided performance ordering of cores may be used via a hardware guided scheduling (HGS) interface. Of course other means of identifying core capabilities can be used in other embodiments. Such information may then be used to restrict a set of cores to which scheduled background tasks may run. More specifically, embodiments may restrict such tasks to least performant cores (or at least less performant cores). In an embodiment, one or more tasks affinity masks may be updated in an OS scheduler to restrict such scheduling. In this way, active scheduled tasks may be dynamically identified and restricted to these least performant cores in real time when user presence is detected. By the same token, when no user presence is detected, such background tasks may be scheduled to any cores. In this way, it is possible to schedule background tasks to most performant cores in the absence of user presence, in an effort to execute such tasks with higher performance (and potentially leading to power savings). Of course it is also possible to restrict such tasks to least performant cores, particularly in a constrained environment.

Figure 18:
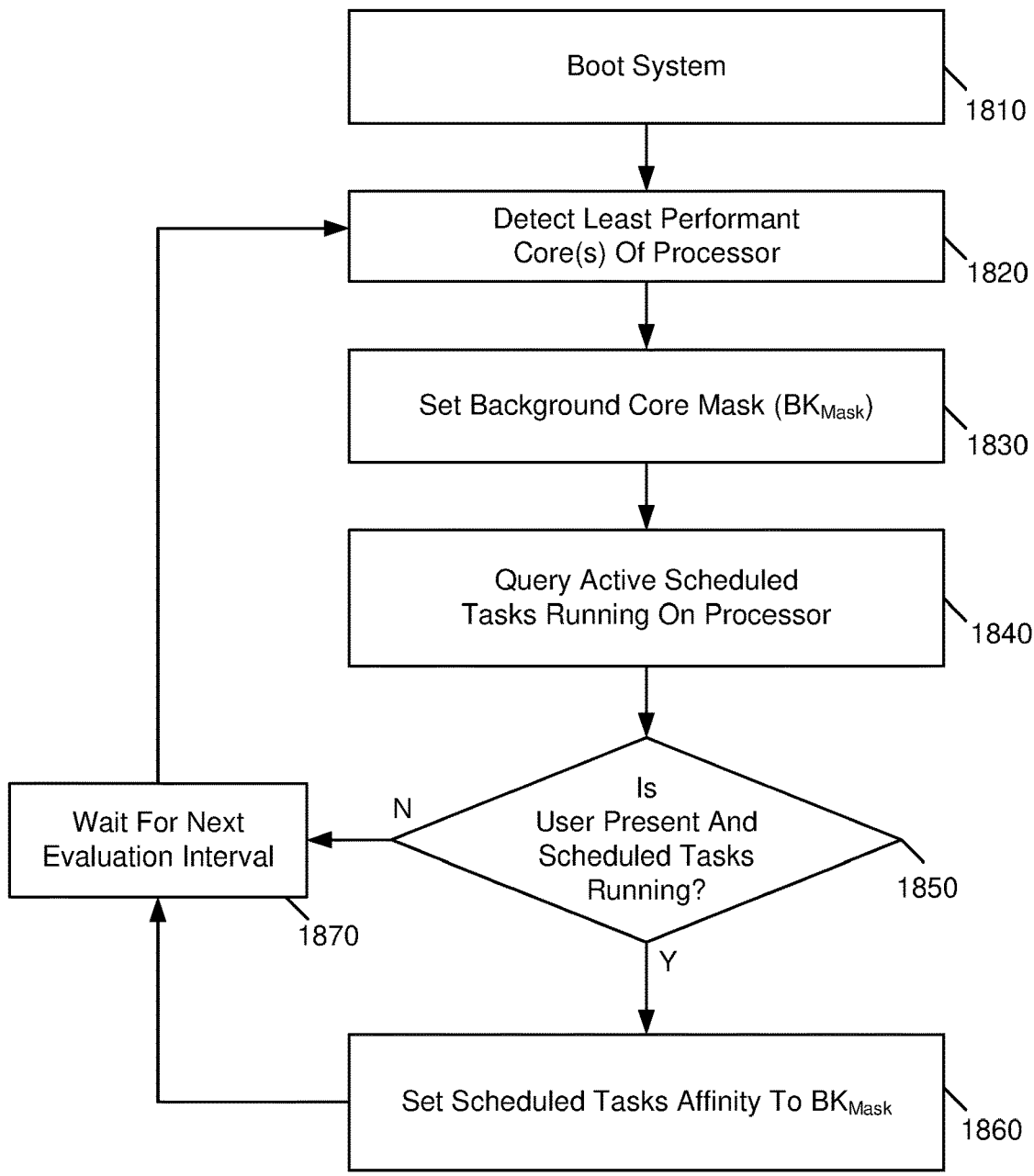
FIG. 18 is a flow diagram of a method in accordance with one embodiment.

Referring now to FIG. 18, shown is a flow diagram of a method in accordance with one embodiment. As shown in FIG. 18, method 1800 is a method for scheduling background tasks to lower performing processing units. In various embodiments, method 1800 may be performed by hardware circuitry, firmware, software and/or combinations thereof. In a particular embodiment, method 1800 may be performed by an OS scheduler.

As illustrated, method 1800 begins on system boot (block 1810). Note that during system boot various initialization operations may occur to initialize the system and its components, including a processor. As part of this initialization process, hardware capability information, including a population count of processor cores and their capabilities, may be provided to the OS. For example, the OS may be provided with an identification of the number of cores and their relative capabilities such as according to a scale of performance capabilities. As will be described herein, this static or baseline information may be updated during system operation.

Still with reference to FIG. 18, at block 1820 one or more least performant cores may be determined dynamically. In some cases this determination may be based on HWP information provided by a power controller. In other cases, this information may be obtained from dynamic hardware guided feedback information received from a PCU or other power controller. In still other cases, combinations of this information and possibly additional information may be used in determining least performant cores. In some cases, the least performant cores may be smaller low power, e.g., in-order, cores in a heterogeneous processor. In other cases, the least performant cores may be based on variation information that identifies lesser performing cores, e.g., due to manufacturing variation. With dynamic hardware guided feedback information, it is possible that in certain operating environments (e.g., a constrained processor environment), a larger, out-of-order core may be identified as a least performant core.

In any event, based at least in part on this determined core capability information, a background core mask may be set (block 1830). Note that in some cases, this background core mask may be a dynamic task affinity mask separate from a default task affinity mask.

Still with reference to FIG. 18, control passes to block 1840 where active scheduled tasks running on the system may be queried. For example, a list of scheduled tasks, namely those tasks that have been scheduled by a user, IT personnel, OEM or otherwise, can be identified for a given evaluation interval. These scheduled tasks may include, for example, regularly scheduled maintenance or security tasks. Next it is determined at diamond 1850 whether a user is present and one or more of the scheduled tasks are running. Although embodiments are not limited in this regard, user presence may be detected by way of user interaction with an input/output device (e.g., keyboard, mouse, touchscreen, microphone or so forth). In other cases, user presence may be detected using one or more sensors of a platform, such as one or more cameras, e.g., possibly using eye gaze detection. If it is determined that a user is not present, control passes to block 1870 where no further operations occur, and method 1800 reverts to block 1820 for the next evaluation interval. Although embodiments are not limited in this regard, in one embodiment this next evaluation interval may be approximately 5 seconds. Of course longer or shorter durations are possible.

With reference still to FIG. 18, if it is determined that a user is present and scheduled tasks are running, control passes to block 1860, where a scheduler may set these scheduled tasks' affinity to a background core mask. That is, these scheduled tasks may be scheduled to run only on the determined one or more least performant cores. As such, when user presence is detected, active scheduled tasks are dynamically identified and restricted to least performant cores in real time. Note that as a result of setting the scheduled tasks' affinity to the background core mask, a dynamic migration of background tasks may occur, such that any background tasks that are currently in execution on a more performant core may be dynamically migrated to a less performant core. With embodiments herein, performance gains may be realized, particularly on application startup, web browsing and productivity workloads. Understand as just described above in FIG. 18 as to scheduling certain tasks to least performant cores, note there can be a range of core performance capabilities. As such, when user presence is identified while background or scheduled tasks are executing, a range of cores, beginning from the least performant, may be selected for scheduling these background tasks, where each core may not have the exact same performance capability.

Embodiments also may provide dynamic system optimizations to help achieve optimal battery life during non-critical or idle user sessions while at the same time achieving responsiveness when a user is present. To this end, battery life may be optimized in scenarios when a user is not actively interacting with a system and no user critical tasks are in execution while running on battery power.

To this end, embodiments may monitor user interaction with a system while maintaining information regarding scheduled background and foreground tasks in execution. With this information, a platform may identify a platform mode of operation and dynamically switch power management policies based on the mode of operation. In this way, when in a quiet mode of operation and running on battery life, background tasks may be executed while applying a background mode power management policy, which may increase battery life.

Figure 19:
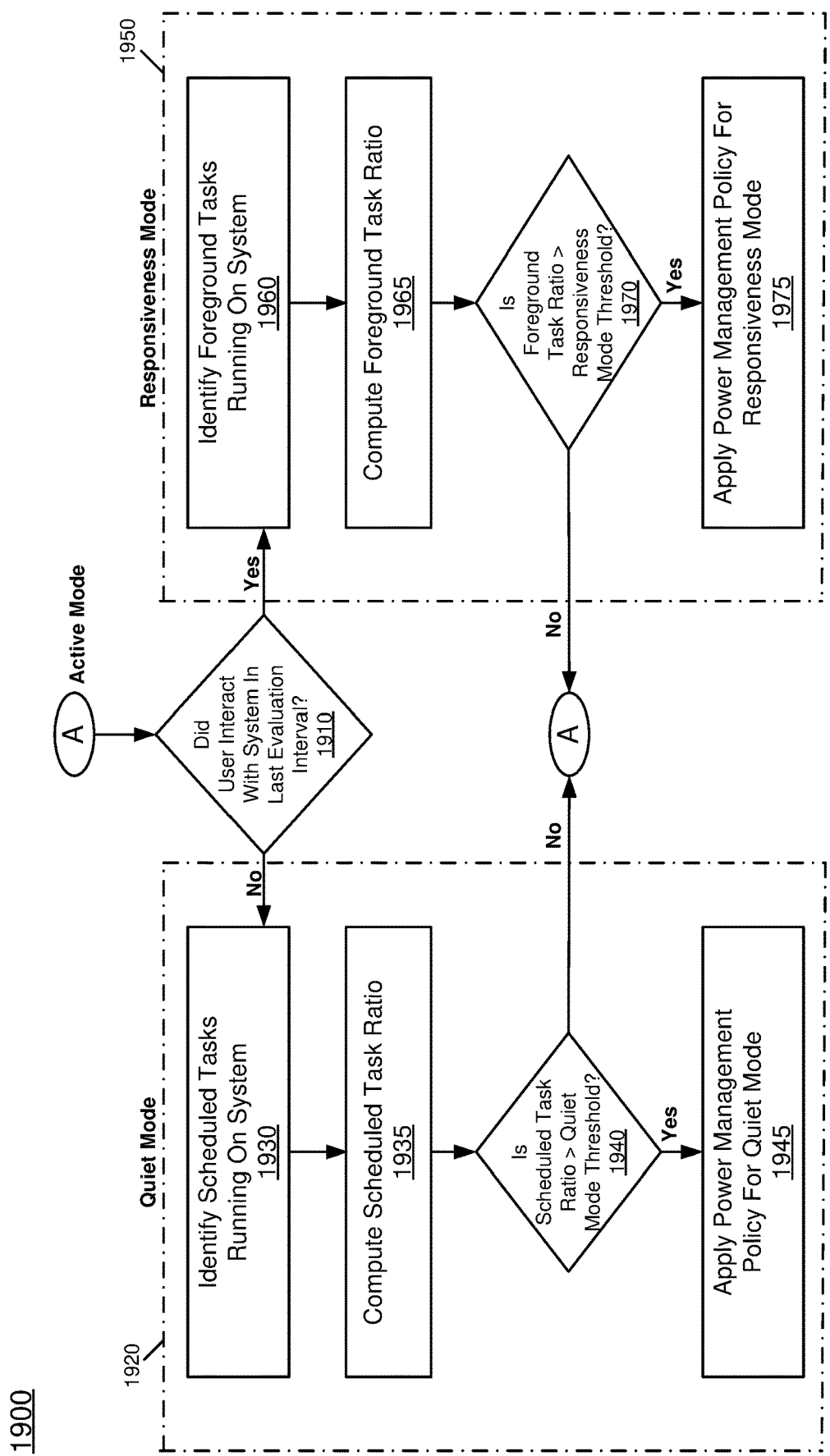
FIG. 19 is a flow diagram of a method in accordance with another embodiment.

Referring now to FIG. 19, shown is a flow diagram of a method in accordance with another embodiment. As shown in FIG. 19, method 1900 is a method for determining a platform mode. In different embodiments, method 1900 may be performed by hardware circuitry, firmware, software and/or combinations thereof. For example, method 1900 may be performed by an OS scheduler, PCU circuitry, or combinations thereof.

As shown, method 1900 may begin in an active mode of a system in which one or more tasks are execution. During this active mode it may be determined whether a user has interacted with the system within a last evaluation interval (block 1910). This determination of user interaction may be based on detection of user interaction with an input/output device, sensor measurements, or so forth.

If it is determined that the user did not interact with the system within the time duration of the last evaluation interval, control passes to a quiet mode loop 1920. Various operations may be performed in quiet mode loop 1920 to determine whether a power management policy for a quiet mode may be appropriate. As illustrated, quiet mode loop 1920 includes identifying scheduled tasks that are running on the system (block 1930). As discussed above, such scheduled tasks may be scheduled by a user, IT personnel, OEM or entity, e.g., for regularly scheduled maintenance or security activity.

Next, at block 1935 a scheduled task ratio may be computed. In one embodiment, the scheduled task ratio may be calculated according to Equation 1: Scheduled Task Ratio=Total CPU Time (Scheduled Tasks)/Total CPU Active Time [EQ. 1]. Next it is determined whether the scheduled task ratio exceeds a quiet mode threshold (diamond 1940). Although this quiet mode threshold may have different values in different embodiments, in an example embodiment the quiet mode threshold may be set at approximately 50%.

If it is determined that the scheduled task ratio does not exceed this quiet mode threshold, quiet mode loop 1920 is exited and normal active mode may proceed. Otherwise if it is determined at diamond 1940 that the scheduled task ratio exceeds the quiet mode threshold, control passes to block 1945 where a power management policy for quiet mode may be applied. In an embodiment, this power management policy may include one or more configuration values that are provided to a power controller to be used control power consumption. As one example, this power management policy may include one or more reduced power limits. In an embodiment, such reduced power limits may be set at a level less than a long term power limit, e.g., a thermal design power level. The power controller may use such power limits to control power budget allocated to cores or other processing circuits of the processor. With one or more reduced power limits, lower power consumption may be realized when a user is not interacting with the system during execution of scheduled tasks. In addition to power limit settings, this quiet mode power management policy may further include biasing of an energy performance preference towards energy efficiency and away from performance, capping processor frequency/performance to an efficient level, and/or engaging deep core and package idle states aggressively (i.e., reducing idle state demotions), among other operations.

Instead if it is determined at diamond 1910 that the user did in fact interact with the system during the last evaluation interval, control passes to block 1950 for execution of a responsiveness loop 1950. Various operations may be performed in responsiveness mode loop 1950 to determine whether a power management policy for a responsiveness mode may be appropriate. As illustrated, responsiveness mode loop 1950 includes identifying foreground tasks that are running on the system (block 1960). As discussed above, such foreground tasks are those in which a user is interacting with a platform in real time.

Next at block 1965 a foreground task ratio may be computed. In one embodiment, the foreground task ratio may be calculated according to Equation 2: Foreground Task Ratio=Total Foreground CPU Time/Total CPU Time [EQ. 2]. Next it is determined whether the foreground task ratio exceeds a responsiveness mode threshold (diamond 1970). This responsiveness mode threshold may have different values in different embodiments. Note that the mode thresholds may be configurable, e.g., by an OEM or an Intel® DPTF component.

If it is determined that the responsiveness foreground task ratio does not exceed this responsiveness mode threshold, responsiveness mode loop 1950 is exited and normal active mode may proceed. Otherwise if it is determined at diamond 1970 that the foreground task ratio exceeds the responsiveness mode threshold, control passes to block 1975 where a power management policy for responsiveness mode may be applied. In an embodiment, this power management policy may include one or more configuration values that are provided to a power controller to be used control power consumption. As one example, this power management policy may include one or more increased power limits. In an embodiment, such increased power limits may be set at a level greater than a thermal design power level. With one or more increased power limits, higher power consumption may be realized for these user critical tasks. Note however that a power controller may limit operation below such increased power limits based on certain constraints such as battery charge level, skin temperature/thermals, or so forth. In addition to power limit settings, this responsiveness mode power management policy may further include biasing of an energy performance preference towards performance and away from energy efficiency, requesting minimum performance to guaranteed performance (P1), aggressively demoting core and package idle states to stay in shallower idle states for performance, among other operations.

In embodiments, background tasks can be accurately detected and least performing cores can be dynamically identified. With this information a responsiveness impact due to scheduled tasks may be reduced while running them efficiently to preserve battery life. Embodiments thus enable more performant cores to be dynamically reserved for user responsive tasks while instead enabling less performant cores to execute any background tasks. Embodiments further may, based on a dynamically identified mode of operation, optimize platform power and performance/responsiveness. In this way, user experience may be improved and AC-like performance/responsiveness may be delivered for short user critical tasks while operating on battery power.

Such user critical tasks may include, as examples, document content creation, application processing, document exporting, file or application opening or so forth. And battery life improvements may be realized for quiet mode scenarios in which background tasks are in execution.

Embodiments may further work with machine learning-based solutions trained to detect user interaction behavior and engagement patterns with a platform to enable appropriate detection and/or prediction of platform mode changes.

The following examples pertain to further embodiments.

In one example, a processor comprises: at least one core; and a power controller coupled to the at least one core. The power controller may include: a workload monitor circuit to calculate a background task ratio based on a first amount of time that the at least one core executed background tasks during an active duration; and a control circuit to dynamically apply a power management policy for a background mode when the background task ratio exceeds a background mode threshold, the power management policy for the background mode to reduce power consumption of the processor.

In an example, the power management policy comprises a power limit less than a thermal design power level of the processor.

In an example, the workload monitor circuit further is to calculate a foreground task ratio based on a second amount of time that the at least one core executed foreground tasks during a second duration.

In an example, the control circuit is to dynamically apply a power management policy for a responsiveness mode when the foreground task ratio exceeds a responsiveness mode threshold, the power management policy for the responsiveness mode to increase performance of the processor, where the power management policy for the responsiveness mode comprises a power limit greater than a thermal design power level of the processor.

In an example, the control circuit is to maintain a current power management policy when the foreground task ratio does not exceed the responsiveness mode threshold.

In an example, the control circuit is to dynamically apply the power management policy for the background mode when a user did not interact with a system including the processor within an evaluation interval.

In an example, the control circuit is to calculate the background task ratio when a user did not interact with a system including the processor within an evaluation interval.

In an example, the power controller comprises a hardware feedback circuit to determine feedback information comprising an energy efficiency capability and a performance capability of the at least one core.

In an example, the hardware feedback circuit is to send the feedback information to a scheduler to enable the scheduler to schedule one or more background tasks to a less performant core based at least in part on the feedback information, when a user interaction with a system including the processor is detected.

In an example, the power controller is to send hardware capability information of a plurality of cores of the processor to a scheduler to enable the scheduler to schedule one or more background tasks to a less performant core of the plurality of cores based at least in part on the hardware capability information, when a user interaction with a system including the processor is detected.

In another example, a method comprises: identifying at least one first core of a multicore processor of a system that is less performant than at least one second core of the multicore processor; setting a background core mask to indicate an affinity of the at least one first core for background task execution; determining whether a user of the system is present; and in response to determining the user presence, scheduling at least one background task to the at least one first core using the background core mask.

In an example, the method further comprises identifying the at least one first core based at least in part on feedback information comprising energy efficiency information and performance information.

In an example, the method further comprises setting the background core mask having one or more values different than a default core mask.

In an example, the method further comprises scheduling one or more foreground tasks to the at least one second core.

In an example, the method further comprises in response to determining that the user is not present, scheduling the at least one background task to the at least one second core.

In an example, the method further comprises calculating a background task ratio based on a first amount of time that the multicore processor executed background tasks during an active duration.

In an example, the method further comprises configuring a power controller of the multicore processor with a power management policy for a background mode when the background task ratio exceeds a background mode threshold, the power management policy for the background mode to reduce power consumption of the multicore processor.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a system comprises a processor and a system memory coupled to the processor. The processor may include: a plurality of cores, including one or more first cores and one or more second cores, the one or more first cores heterogenous to the one or more second cores; and a power controller coupled to the plurality of cores. The power controller may include: a hardware feedback control circuit to determine first hardware feedback information for the one or more first cores and second hardware feedback information for the one or more second cores and send the first and second hardware feedback information to a scheduler, where the first and second hardware feedback information comprises energy efficiency capability information and performance capability information; and a control circuit to update a power management policy based on mode hint information from the scheduler, the mode hint information based on task ratio information and a user interaction determination, where the power controller is to update at least one of a frequency and a voltage for at least the one or more first cores based on the updated power management policy. The system memory may comprise a hardware feedback data structure to store the first and second hardware feedback information.

In an example, when the mode hint information comprises a background mode, the control circuit is to reduce at least one of the frequency and the voltage for the at least one or more first cores.

In an example, the scheduler is to update a background task affinity mask based at least in part on the first and second hardware feedback information and use the updated background task affinity mask to schedule one or more background tasks to the one or more first cores and to restrict the one or more background tasks from the one or more second cores.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor, comprising:
a plurality of cores including a first plurality of cores and a second plurality of cores, the second plurality of cores comprising relatively lower power cores than the first plurality of cores;
graphics processing circuitry to perform graphics operations;
a memory controller to couple the plurality of cores and the graphics processing circuitry to a memory; and
power control circuitry to control power consumption of the plurality of cores and the graphics processing circuitry, the power control circuitry to determine background task metric information based on a first amount of time that at least one core of the plurality of cores executed background tasks during an active duration, the power control circuitry to dynamically apply a power management policy for a background mode when the background task metric information exceeds a first threshold, the power management policy for the background mode to reduce power consumption of at least the processor.

2. The processor of claim 1, wherein to dynamically apply the power management policy includes, to apply a power limit less than a thermal design power level of the processor.

3. The processor of claim 2, wherein to apply a power limit less than a thermal design power level of the processor includes, to reduce a frequency or voltage of the at least one core.

4. The processor of claim 3, wherein the power control circuitry is to dynamically apply a power management policy for a responsiveness mode when a foreground task metric exceeds a responsiveness mode threshold, the power management policy for the responsiveness mode to increase performance of the processor, wherein the power management policy for the responsiveness mode comprises a power limit greater than the thermal design power level of the processor.

5. The processor of claim 4, wherein the power control circuitry is to maintain a current power management policy when the foreground task metric does not exceed the responsiveness mode threshold.

6. The processor of claim 3, wherein the power control circuitry is to dynamically apply the power management policy for the background mode when a user did not interact with a system including the processor within an evaluation interval.

7. The processor of claim 3, wherein the power control circuitry is to calculate the background task metric information when a user did not interact with a system including the processor within an evaluation interval.

8. The processor of claim 1, wherein the power control circuitry comprises a hardware feedback circuit to determine feedback information comprising an energy efficiency capability and a performance capability of the at least one core.

9. The processor of claim 8, wherein the hardware feedback circuit is to send the feedback information to a scheduler to enable the scheduler to schedule one or more background tasks to a less performant core based at least in part on the feedback information, when a user interaction with a system including the processor is detected.

10. The processor of claim 1, wherein the power control circuitry is to send hardware capability information of the plurality of cores of the processor to a scheduler to enable the scheduler to schedule one or more background tasks to a less performant core of the plurality of cores based at least in part on the hardware capability information, when a user interaction with a system including the processor is detected.

11. The processor of claim 1 wherein the background task metric information comprises a ratio based on a total time a background task is scheduled on the at least one core relative to a total active time of the at least one core.

12. The processor of claim 1, wherein the background task metric information comprises a ratio based on a first amount of time that the at least one core executed background tasks during an active duration.

13. At least one non-transitory computer readable medium comprising instructions, which when executed by a processor, cause the processor to execute a method comprising:
determining background task metric information based on a first amount of time that at least one core of a plurality of cores of a processor executed background tasks during an active duration, the plurality of cores comprising a first plurality of cores and a second plurality of cores, the second plurality of cores comprising relatively lower power cores than the first plurality of cores; and
dynamically applying a power management policy for a background mode when the background task metric information exceeds a first threshold, the power management policy for the background mode to reduce power consumption of at least the processor.

14. The at least one non-transitory computer readable medium of claim 13, wherein the method further comprises dynamically applying the power management policy for the background mode when a user did not interact with a system including the processor within an evaluation interval.

15. The at least one non-transitory computer readable medium of claim 13, wherein the method further comprises calculating the background task metric information when a user did not interact with a system including the processor within an evaluation interval.

16. The at least one non-transitory computer readable medium of claim 13, wherein the method further comprises dynamically applying a power management policy for a responsiveness mode when foreground task metric information exceeds a responsiveness mode threshold, the power management policy for the responsiveness mode to increase performance of the processor, wherein the power management policy for the responsiveness mode comprises a power limit greater than a thermal design power level of the processor.

17. The at least one non-transitory computer readable medium of claim 16, wherein the method further comprises maintaining a current power management policy when the foreground task metric information does not exceed the responsiveness mode threshold.

18. The at least one non-transitory computer readable medium of claim 13, wherein the method further comprises determining feedback information comprising an energy efficiency capability and a performance capability of the at least one core.

19. The at least one non-transitory computer readable medium of claim 18, wherein the method further comprises sending the feedback information to a scheduler to enable the scheduler to schedule one or more background tasks to a less performant core based at least in part on the feedback information, when a user interaction with a system including the processor is detected.

20. The at least one non-transitory computer readable medium of claim 18, wherein the method further comprises sending hardware capability information of the plurality of cores of the processor to a scheduler to enable the scheduler to schedule one or more background tasks to a less performant core of the plurality of cores based at least in part on the hardware capability information, when a user interaction with a system including the processor is detected.

* * * * *